US012627554B2

(12) United States Patent　(10) Patent No.:　US 12,627,554 B2
Yao et al.　(45) Date of Patent:　**\*May 12, 2026**

(54) MANAGEMENT DATA ANALYTICS

(71) Applicant: Intel Corporation, Santa Clara, CA (US)

(72) Inventors: Yizhi Yao, Chandler, AZ (US); Joey Chou, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,074

(22) Filed: Feb. 15, 2024

(65) Prior Publication Data

US 2024/0250887 A1　Jul. 25, 2024

Related U.S. Application Data

(63) Continuation of application No. 17/062,006, filed on Oct. 2, 2020, now Pat. No. 11,943,122.

(Continued)

(51) Int. Cl.
　*H04L 41/0631*　(2022.01)
　*G06N 5/04*　(2023.01)
　(Continued)

(52) U.S. Cl.
　CPC ........... *H04L 41/0631* (2013.01); *G06N 5/04* (2013.01); *G06N 20/00* (2019.01);
　(Continued)

(58) Field of Classification Search
　CPC ...... G06N 5/04; G06N 20/00; H04L 41/0631; H04L 41/147; H04L 41/16; H04L 41/5009; H04L 41/5067; H04L 43/04; H04L 43/06
　See application file for complete search history.

(56) References Cited

U.S. PATENT DOCUMENTS

2019/0215700 A1 *　7/2019　Sofuoglu ............... H04W 24/02
2020/0127901 A1 *　4/2020　Hariharan ............ H04B 17/336
　(Continued)

OTHER PUBLICATIONS

"3rd Generation Partnership Project; Technical Specification Group Services and System Aspects; Management and orchestration; Performance assurance (Release 15)," 3GPP TS 28.550 v15.2.0 (Sep. 25, 2019), 81 pages.

(Continued)

*Primary Examiner* — Thomas J Dailey
(74) *Attorney, Agent, or Firm* — Schwegman Lundberg & Woessner, P.A.

(57)　ABSTRACT

Disclosed embodiments are related to Management Data Analytics (MDA) relation with Self-Organizing Network (SON) functions and coverage issues analysis use case. An MDA Service (MDAS) obtains input data related to one or more managed networks and services from one or more data sources; generates an analytics report based on analysis of the input data; and sends an analytics report to a Self-Organizing Network (SON) function for root cause analysis of ongoing issues, prevention of potential issues, and/or prediction of network or service demands. The analytics report may describe an identified network or cell coverage issue related to the SON function. Other embodiments may be described and/or claimed.

19 Claims, 17 Drawing Sheets

Related U.S. Application Data

(60) Provisional application No. 62/910,053, filed on Oct. 3, 2019.

(51) Int. Cl.

| | |
|---|---|
| *G06N 20/00* | (2019.01) |
| *H04L 41/16* | (2022.01) |
| *H04L 41/5009* | (2022.01) |
| *H04L 41/5067* | (2022.01) |
| *H04L 43/04* | (2022.01) |
| *H04L 43/06* | (2022.01) |

(52) U.S. Cl.
CPC .......... *H04L 41/5009* (2013.01); *H04L 43/04* (2013.01); *H04L 43/06* (2013.01); *H04L 41/16* (2013.01); *H04L 41/5067* (2013.01)

(56) References Cited

U.S. PATENT DOCUMENTS

| | | | |
|---|---|---|---|
| 2020/0259700 A1* | 8/2020 | Bhalla | G06F 3/0482 |
| 2021/0021494 A1 | 1/2021 | Yao et al. | |
| 2021/0160147 A1 | 5/2021 | Chou et al. | |
| 2022/0150740 A1 | 5/2022 | Yao et al. | |
| 2022/0295337 A1 | 9/2022 | Kim et al. | |
| 2022/0312509 A1 | 9/2022 | Kim et al. | |

OTHER PUBLICATIONS

"3rd Generation Partnership Project; Technical Specification Group Services and System Aspects; Telecommunication management; Study on the Self-Organizing Networks (SON) for 5G networks (Release 16)" 3GPP TR 28.861 v0.7.0 (Sep. 22, 2019), 49 pages.

"3rd Generation Partnership Project; Technical Specification Group Services and System Aspects; Management and orchestration; Concepts, use cases and requirements (Release 16)", 3GPP TS 28.530 v16.0.0 (Sep. 25, 2019), 29 pages.

"3rd Generation Partnership Project; Technical Specification Group Services and System Aspects; Management and orchestration; Architecture framework (Release 16)", 3GPP TS 28.533 v16.1.0 (Sep. 25, 2019), 27 pages.

"3rd Generation Partnership Project; Technical Specification Group Services and System Aspects; Telecommunication management; Study on management aspects of communication services (Release 16)", 3GPP TR 28.805 v16.0.0 (Sep. 25, 2019), 42 pages.

"3rd Generation Partnership Project; Technical Specification Group Services and System Aspects; Telecommunication Management; Self-Organizing Networks (SON); Concepts and requirements (Release 15)", 3GPP TS 32.500 v15.0.0 (Jun. 27, 2018), 13 pages.

"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)", 3GPP TS 32.522 v11.7.0 (Sep. 20, 2013), 58 pages.

"3rd Generation Partnership Project; Technical Specification Group Radio Access Network; Study on RAN-centric data collection and utilization for LTE and NR (Release 16)", 3GPP TR 37.816 v16.0.0 (Jul. 23, 2019), 35 pages.

United States Patent Office—Office Action mailed Nov. 23, 2022, from U.S. Appl. No. 17/062,006, 15 pages.

United States Patent Office—Final Office Action mailed Mar. 2, 2023, from U.S. Appl. No. 17/062,006, 15 pages.

United States Patent Office—Office Action mailed Jul. 27, 2023, from U.S. Appl. No. 17/062,006, 17 pages.

United States Patent Office—Notice of Allowance mailed Nov. 29, 2023, from U.S. Appl. No. 17/062,006, 8 pages.

Yao, Yizhi, et al., "Performance Assurance for 5G Networks Including Network Slicing," Journal of ICT Standardization, vol. 7, Issue 2 (May 2019): 93-108; accessed <https://doi.org/10.13052/jicts2245-800X.722> (Year: 2019).

"U.S. Appl. No. 17/062,006, 312 Amendment filed Dec. 19, 2023", 7 pgs.

"U.S. Appl. No. 17/062,006, Advisory Action mailed Jun. 2, 2023", 5 pgs.

"U.S. Appl. No. 17/062,006, Examiner Interview Summary mailed Apr. 25, 2023", 3 pgs.

"U.S. Appl. No. 17/062,006, PTO Response to Rule 312 Communication mailed Jan. 17, 2024", 2 pgs.

"U.S. Appl. No. 17/062,006, Response filed Feb. 22, 2023 to Non Final Office Action mailed Dec. 23, 2022", 7 pgs.

"U.S. Appl. No. 17/062,006, Response filed May 2, 2023 to Final Office Action mailed Mar. 2, 2023", 9 pgs.

"U.S. Appl. No. 17/062,006, Response filed Jul. 3, 2023 to Advisory Action mailed Jun. 2, 2023", 13 pgs.

"U.S. Appl. No. 17/062,006, Response filed Oct. 18, 2023 to Non Final Office Action mailed Jul. 27, 2023", 7 pgs.

Yao, Yizhi, et al., "Performance Assurance for 5G Networks Including Network Slicing", Journal Of ICT Standardization vol. 7 Issue 2, (2019), 16 pgs.

\* cited by examiner

MANAGEMENT DATA ANALYTICS

CROSS REFERENCE TO RELATED APPLICATION

The present application is a continuation of U.S. application Ser. No. 17/062,006 filed Oct. 2, 2020, which claims priority to U.S. Provisional App. No. 62/910,053 filed Oct. 3, 2019, the contents of each of which are hereby incorporated by reference in their entireties.

FIELD

Embodiments relate generally to the technical field of wireless communications and communication networks, and in particular to Management Data Analytics (MDA) in relation to coverage issue analysis for self-organizing networks (SON).

BACKGROUND

Fifth Generation (5G) networks have the capability to support a variety of communication services, such as Internet of Things (IOT) and Enhanced Mobile Broadband (eMBB). The increasing flexibility of the networks to support services with diverse requirements may present operational and management challenges. Therefore, 5G networks management system can benefit from Management Data Analytics (MDA) for improving networks performance and efficiency to accommodate and support the diversity of services and requirements.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

Figure 1:
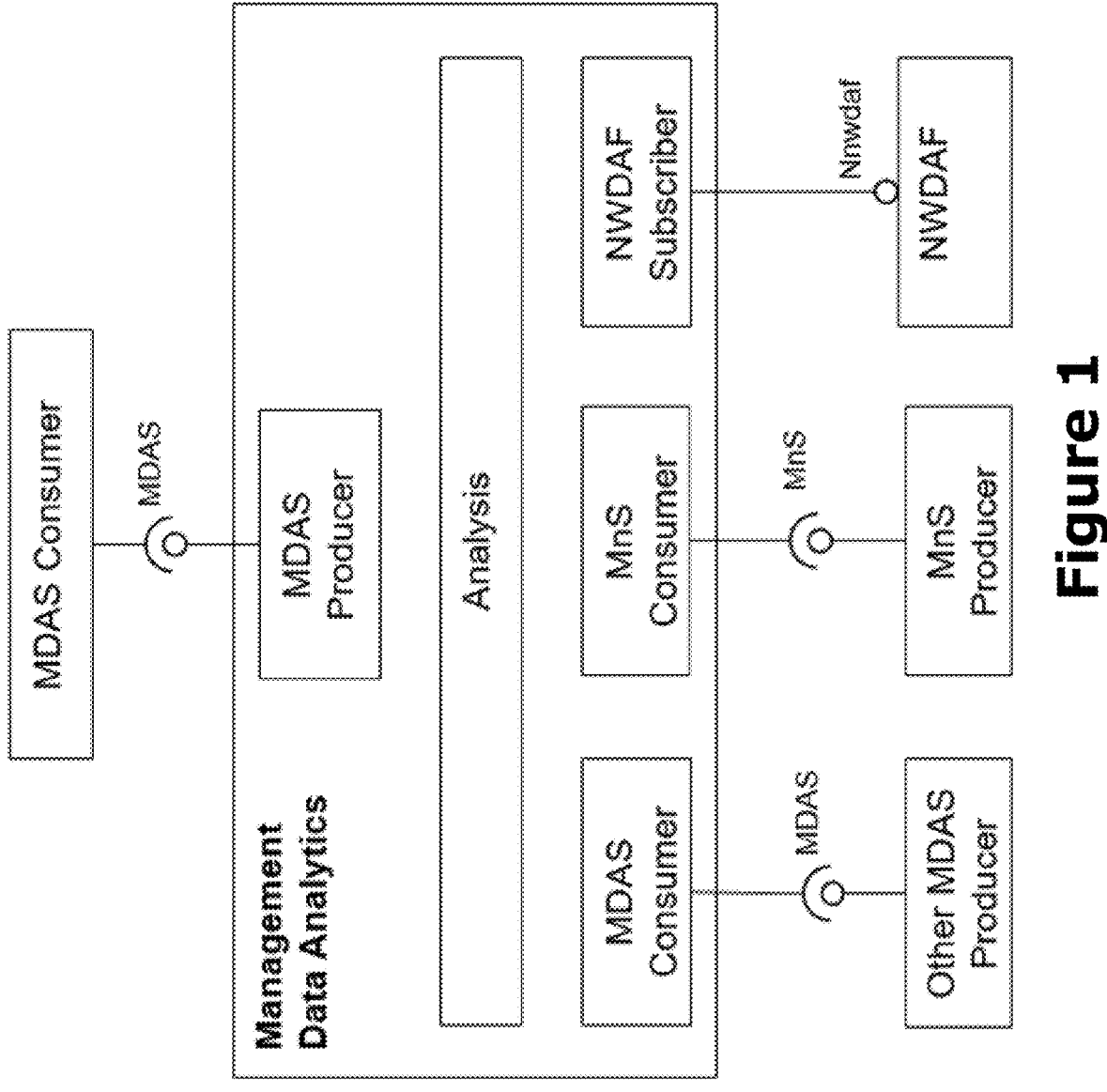
FIG. 1 illustrates functionality provided by a Management Data Analytics (MDA), according to various embodiments.

DETAILED DESCRIPTION 5G networks have the capability to support a variety of communication services, such as IoT and eMBB. The increasing flexibility of the networks to support services with diverse requirements may present operational and management challenges. 5G networks management system can therefore benefit from Management Data Analytics (MDA) for improving networks performance and efficiency to accommodate and support the diversity of services and requirements.

MDA Service(s) (MDAS) can potentially be consumed by various Management Functions (MFs) (e.g., Management Service (MnS) producers/consumers) and Network Functions (NFs) including, for example, Network Data Analytics Function (NWDAF), Self-Organizing Network (SON) functionalities, Network Function Management Function (NFMF), Communication Service Management Function (CSMF), etc. However, the MDA has not yet been completely specified, for example, it is still unclear what and how MDAS is provided and/or consumed.

According to 3GPP TS 28.550 ("[1]"), MDA can be performed to diagnose ongoing issues impacting the performance of the mobile network and predict any potential issues (e.g., potential failure and/or performance degradation).

For diagnosis of network issues, the root cause(s) need to be figured out precisely. One network issue may result in multiple symptoms, such as alarms, performance degradation, user complaints, etc., and the MDAS can analyse these symptoms and provide (or be part of process of providing, such as SON) the precise root cause indication to the consumer. For instance, repeated coverage holes and interference spots in the radio coverage of a network may result in low data throughput, high packet loss rate, high power consumption and potentially leading to RRC connection setup failures affecting the quality of end user experience.

For prevention of potential network issues (e.g., potential resource shortage), the MDAS can analyse the network status (e.g., measurements related to load and resource usage) in connection with other related data from the past and provide indications of potential issues, so the consumer of analytics service may take preventative actions to avoid the issues from happening.

For the critical ongoing and potential network issues, the MDAS output can be used to alert the consumer to take immediate actions.

The network demand changes more dynamically in 5G networks to support diverse services, and need to be fulfilled as soon as possible to shorten the time to market for the new services while assuring the performance of the existing services. The MDAS can make the prediction of the network demand, and the consumer can take necessary actions to fulfil the network demand, for instance the action could be network capacity upgrade, deployment of new NF instances or re-deployment (e.g., relocation) of existing NF instances from demand decreasing location to the demand increasing location.

The MDAS may also provide recommendations on the actions besides the indications of the issues or predictions. In addition, the MDAS can also support the optimization of networks, services and functionalities. Furthermore, the MDAS can support the automation of network and service management. However the scenarios, use cases and potential solutions for the aspects mentioned above have not yet been specified. It is unclear that how the output data produced by MDAS can be consumed by the consumer(s).

The present disclosure provides the overview, process, MDA relation with SON, and MDA coverage issue analysis use cases. These embodiments may be added to 3GPP technical reference (TR) 28.809 ("[6]").

1. MDA Overview

MDA aspects are discussed in, for example, [1], 3GPP TR 28.861 ("[2]"), 3GPP TS 28.530 ("[3]"), 3GPP TS 28.533 ("[4]"), and 3GPP TR 28.805 ("[5]").

The MDA provides capabilities of analysing and processing raw data related to network and service events and status (e.g., performance measurements, Trace, Minimization of Drive Tests (MDT), radio link failure (RLF) reports, RRC Connection Establishment Failure (RCEF) reports, quality of experience (QoE) reports, alarms, configuration data, network analytical data, and service experience data from Application Functions (AFs), etc.) to provide analytics report (including recommended actions) to instruct the necessary actions for network and service operations.

The MDA, in conjunction with Artificial Intelligence (AI) and Machine Learning (ML) techniques, brings intelligence and automation to the network service management & orchestration.

MDA can help to perform management tasks in preparation, commissioning, operation as well as in the termination phases. For example, MDA can support service provisioning by preparing service catalogues, evaluating network requirements for a new service and carrying out feasibility check. During operation phase, the MDA can identify ongoing issues impacting the performance of the network and service, and discover in advance the potential issues that would cause potential failure and/or performance degradation. The MDA can also assist to predict the network and service demand to enable the timely resource provisioning and deployments which would allow fast time-to-market network and service deployment.

The MDAS can be consumed by various consumers, for instance, the MFs (e.g., MnS producers/consumers for network and service management), NFs (e.g., NWDAF), SON functions (e.g., Coverage and Capacity Optimization (CCO), etc.), network and service optimization tools/functions, Service Level Specification (SLS) assurance functions, human operators, AFs, etc.

The MDA is an enabler for the automation and cognition of the network and service management & orchestration.

MDAS provides data analytics of different network related parameters including, for example, load level and/or resource utilisation. For example, the MDAS for an NF can collect the NF's load related performance data, e.g., resource usage status of the NF. The analysis of the collected data may provide forecast of resource usage information in a predefined future time. This analysis may also recommend appropriate actions e.g., scaling of resources, admission control, load balancing of traffic, etc.

An MDAS for a network slice subnet instance (NSSI) provides NSSI related data analytics. The service may consume the corresponding MDAS of its constituent NFs'. The NSSI MDAS may further classify or shape the data in different useful categories and analyse them for different network slice subnet management needs (e.g., scaling, admission control of the constituent NFs, etc.). If an NSSI is composed of multiple other NSSIs, the NSSI MDAS acts as a consumer of MDAS of the constituent NSSIs for further analysis e.g., resource usage prediction, failure prediction for an NSSI, etc.

An MDAS for a network slice instance (NSI) provides NSI related data analytics. The service may consume the corresponding MDAS of its constituent NSSI(s). The NSI MDAS may further classify or shape the data in different useful categories according to different customer needs, e.g., slice load, constituent NSSI load, communication service loads. This data can be used for further analysis (e.g., resource usage prediction, failure prediction for an NSI, etc.).

In a Service Based Management Architecture (SBMA), the MDAS is an MnS provided by an MnS producer. The SBMA may include one or more MnSs. An MnS is a set of offered capabilities for management and orchestration of network and services. The entity producing an MnS is called MnS producer. The entity consuming an MnS is called MnS consumer. An MnS provided by an MnS producer can be consumed by any entity with appropriate authorization and authentication. An MnS producer offers its services via a standardized service interface composed of individually specified MnS components. For purposes of the present disclosure, the MDAF is used to represent the MDAS producer (e.g., the MDAF performs MDA and provides MDAS to its consumers)

2. MDA Functionality

FIG. 1 illustrates the functionality provided by MDA according to various embodiments. Depending on the scenario, the MDA may collect data for analysis by acting as an MDAS Consumer (consuming MDASs from other MDAS producers), as an MnS Consumer (consuming MnSs from one or more MnS producers), and/or as an NWDAF subscriber. After analysis, MDA acts as an MDAS Producer to expose the analysis results to MDAS Consumers. The MnS producer shall have the capability allowing its authorized consumer to obtain information about MnS capabilities.

The MDA utilizes the network management data collected from the network including, for example, service, slicing, and/or network functions related data and make the corresponding analytics based on the collected information. For example, the information provided by Performance Management (PM) data analytics services can be used to optimize network performance, and the information provided by Fault Management (FM) data analytics services can be used to predict and prevent failures of the network. The MDAS can be deployed at different levels, for example, at a domain level (e.g., Radio Access Network (RAN), core network (CN), Network Slice and/or Network Slice Subnet Instance (NSSI), etc.) and/or in a centralized manner (e.g., at the Public Land Mobile Network (PLMN) level).

As examples, the PM data includes measurements collected from NFs, NSSIs and NSIs. Additionally or alternatively, the PM data includes one or more of Radio Resource Control (RRC) connection related measurements (e.g., Attempted RRC connection establishments, RRC connection re-establishments, mean/maximum/minimum number of RRC connections, mean/maximum/minimum RRC connection setup times, UE CONTEXT Release data, Number of successful RRC connection setups in relation to the time between successful RRC connection setup and last RRC connection release, etc.), Radio Access Bearer (RAB) related measurements (e.g., number of initial E-RABs attempted to setup, releases, modifications, activity, numbers, etc.), handover (HO) related measurements (e.g., intra-RAT/inter-RAT HO measurement reports, number of intra-RAT/inter-RAT HO failures, number of intra-RAT/inter-RAT HO successes, etc.), cell level QoS related measurements (e.g., Cell PDCP SDU bit-rate, active UEs, Packet Delay and Drop Rate, packet loss rate, IP latency measurements, IP throughput measurements, etc.), radio resource utilization related measurements (e.g., uplink (UL) and/or downlink (DL) physical resource block (PRB) usage, RACH usage, cell unavailable time, transport block (TB) related measurements, power utilization measurements, etc.), paging related measurements, RAN node-related measurements (e.g., RAN node peak/mean processor usage, memory utilization, etc.), radiofrequency (RF) measurements (e.g., Channel Quality Indicator (CQI) Distribution, Timing Advance Distribution, RSRP measurements and/or statistics, RSRQ measurements and/or statistics, SINR measurements and/or statistics, RLF measurements of Synchronization Signal Block (SSB) beams, etc.), and/or Charging Data Record (CDR) data. As examples, the CDR data includes one or more of voice service results including voice call drops, Short Message Service (SMS) results, UL/DL Data Volume, Report Time, Presence Reporting Area Status, and/or other like CDR data.

3. MDA Process and Role

3.1. MDA Role in Management Loop

The MDA forms a part of the management loop (which can be open loop or closed loop (see e.g., 3GPP TS 32.500 ("[TS32500]")), and it brings intelligence and generates value by processing and analysis of management and network data, where the AI and ML techniques may be utilized. The MDA plays the role of the Analytics element in the management loop illustrated by FIG. 2.

Figure 2:
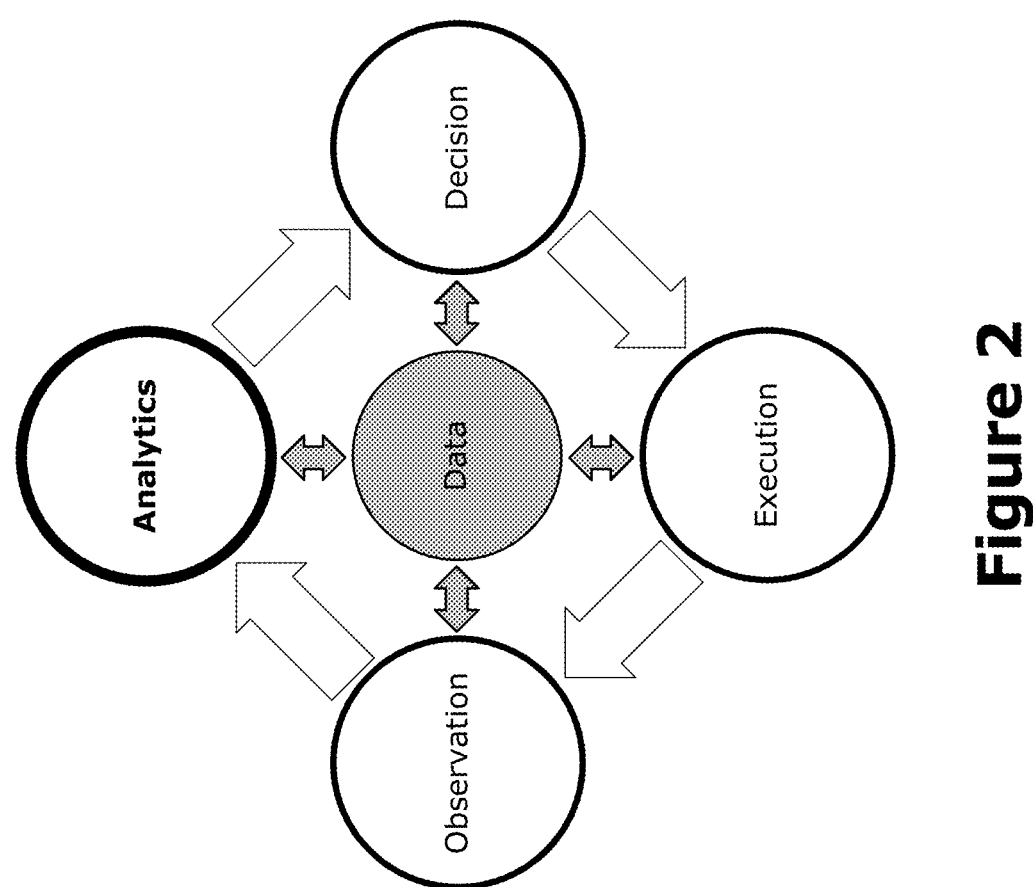
FIG. 2 illustrates analytics in a management loop, according to various embodiments.

In FIG. 2, "observation" refers to the observation of the managed networks and services. The observation involves monitoring and collection of events, status and performance of the managed networks and services, and providing the observed/collected data (e.g., performance measurements, Trace/MDT/RLF/RCEF reports, network analytics reports, QoE reports, alarms, and/or the like).

"Analytics" refers to the data analytics for the managed networks and services. The MDA described in the TR plays the role of Analytics in the management loop. The MDA prepares, processes and analyzes the data related to the managed networks and services, and provides the analytics reports for root cause analysis of ongoing issues, prevention of potential issues and prediction of network or service demands. The analytics report contains the description of the issues or predictions with optionally a degree of confidence indicator, the possible causes for the issue and the recommended actions. Techniques such as AI and ML (e.g., ML model) may be utilized with the input data including not only the observed data of the managed networks and services, but also the execution reports of actions (taken by the execution step). The MDA classifies and correlates the input data (current and historical data), learn and recognize the data patterns, and makes analysis to derive inference, insight and predictions.

"Decision" refers to the decision making for the management actions for the managed networks and services. The management actions are decided based on the analytics reports (provided by MDA) and other management data (e.g., historical decisions made) if necessary. The decision may be made by the consumer of MDAS (in the closed management loop), or a human operator (in the open management loop). The decision includes what actions to take, and when to take the actions. "Execution" refers to the execution of the management actions according to the decisions. During the execution step, the actions are carried out to the managed networks and services, and the reports (e.g., notifications, logs) of the executed actions are provided.

3.2. Management Interaction with NWDAF and GNB

There are two types of data analytics services, one is the network data analytics service provided by NWDAF, another is the MDAS provided by 3GPP management system. The MDAS producer provides the analytics data for management purposes based on the data related to different types of NFs, e.g., data reported from gNB and other core network functions. The MDAS producer may use the analytics result of NWDAF as input.

Figure 3:
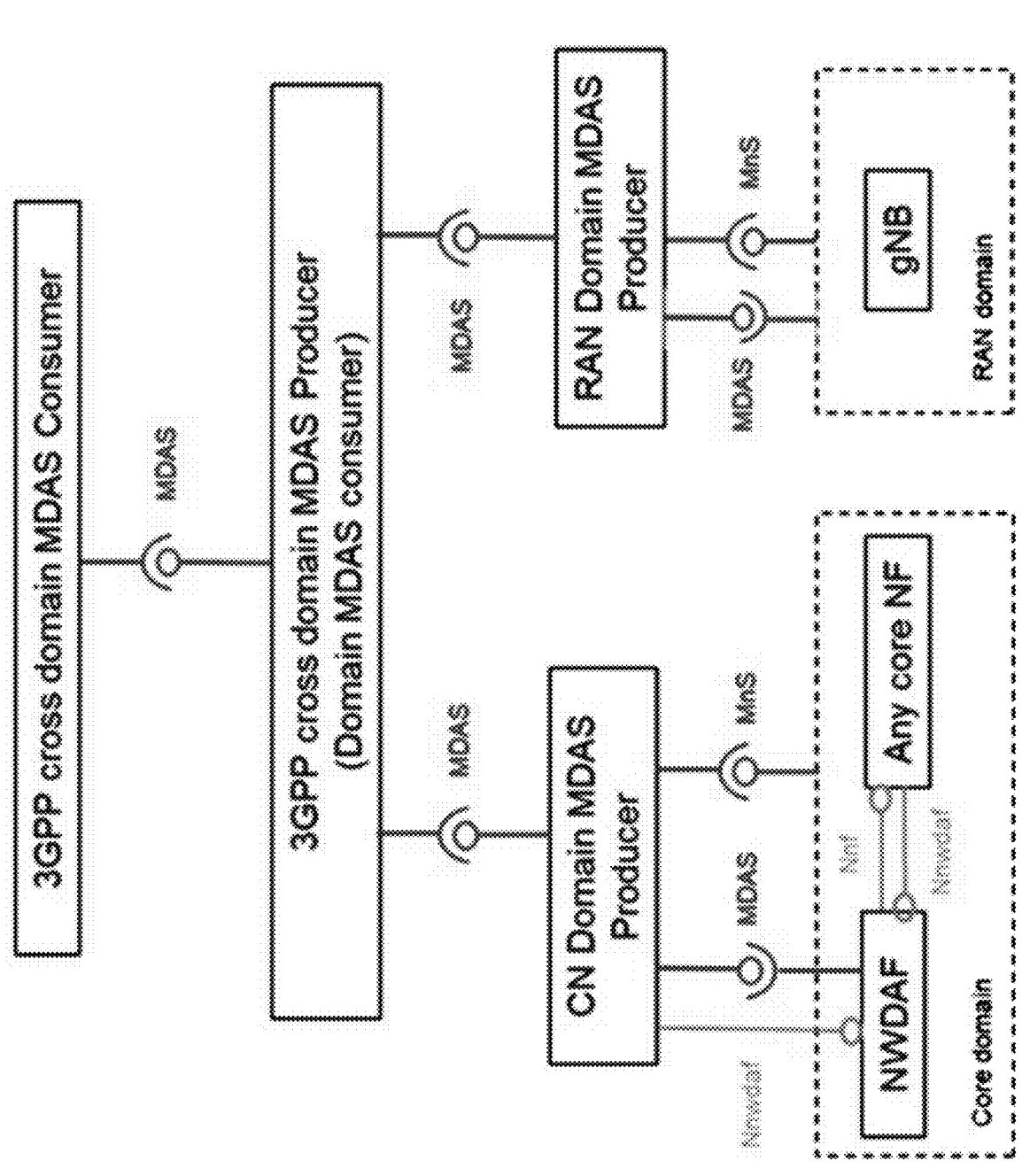
FIG. 3 illustrates an example of coordination between a Network Data Analytics Function (NWDAF), next generation NodeB (gNB), and a Management Data Analytics Service (MDAS) producer for data analytics, according to various embodiments.

FIG. 3 illustrates an example of coordination between a Network Data Analytics Function (NWDAF), next generation NodeB (gNB), and a Management Data Analytics Service (MDAS) producer for data analytics, according to various embodiments. In FIG. 3, the NWDAF may consume the MDAS for identified scenarios and provide analytics service for 5GC NF for control purpose. The CN Domain MDAS producer may consume the service provided by NWDAF and other 5GC NFs and provide analytics data for management purpose. The gNB many consume the MDAS for identified scenarios for RAN control purpose. The RAN Domain MDAS producer may consume the service provided by gNB and provide analytics data for management purpose.

Figure 4:
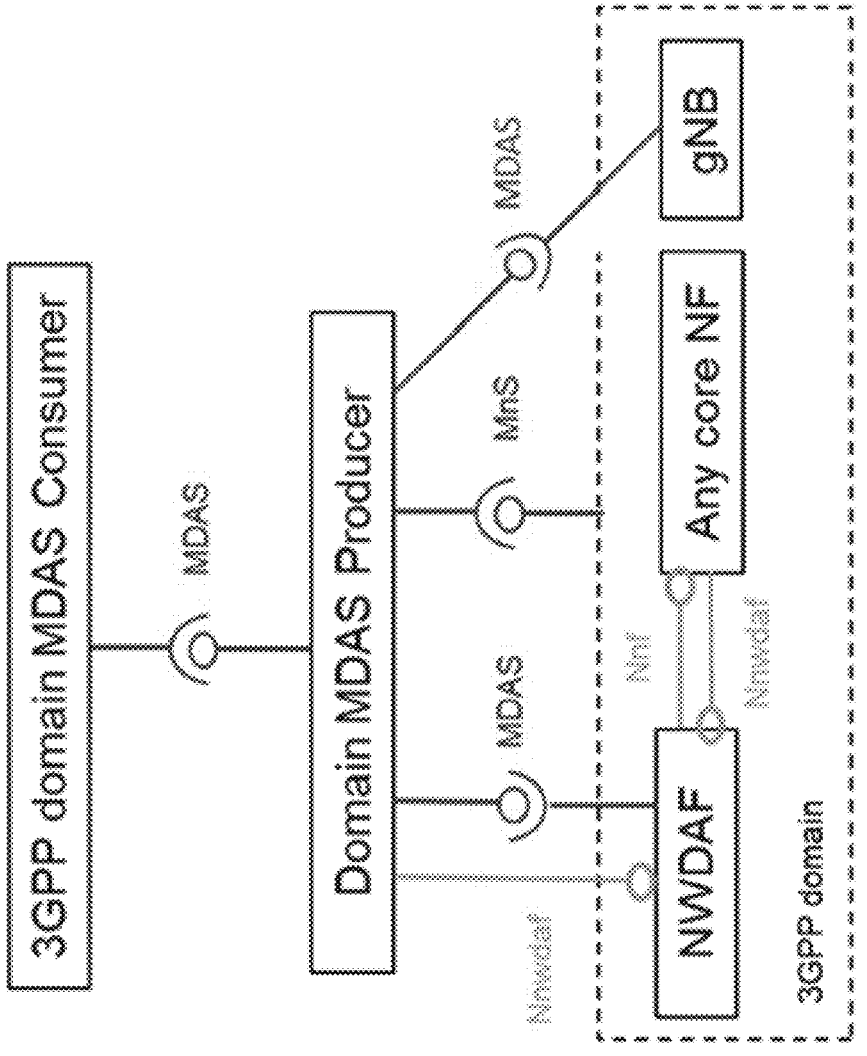
FIG. 4 illustrates an example of coordination between NWDAF, gNB and MDAS producer for data analytics, according to various embodiments.

FIG. 4 shows another example of the coordination between NWDAF and MDAS producer for data analytics purpose. Referring to FIG. 4, the NWDAF may consume the MDAS for identified scenarios and provide analytics service for 5GC NF for control purpose. The gNB may consume the MDAS for identified scenarios for RAN control purpose, and the Domain MDAS producer may consume the service provided by NWDAF, other 5GC NFs and gNB, provide analytic data for management purpose.

3.3. MDA Process

The MDA brings intelligence and generates value by processing and analysis of large amounts of data, where the AI and ML techniques are widely used. This clause describes the MDA process in conjunction with AI and ML techniques.

Figure 5:
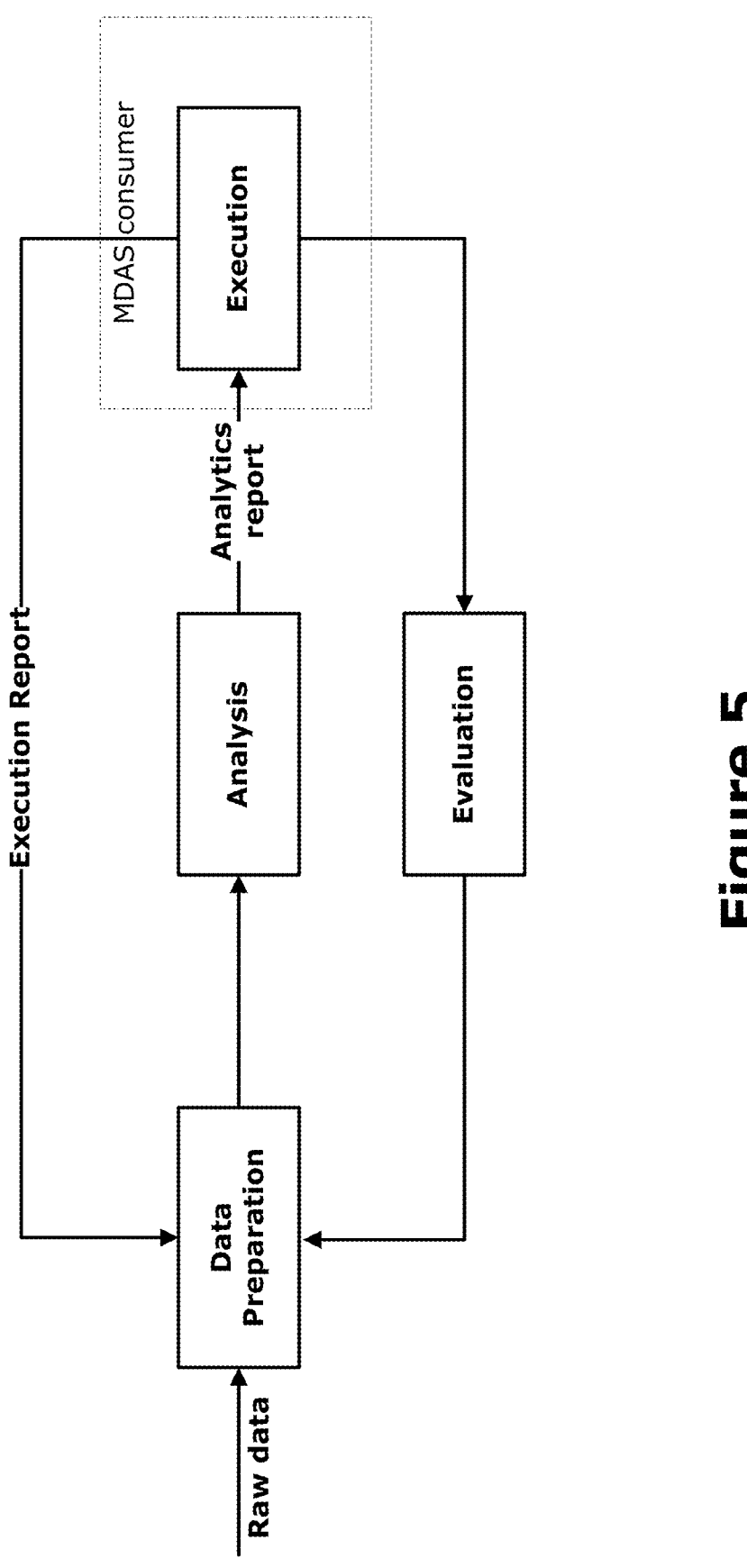
FIGS. 5 and 6 illustrate example MDA processes according to various embodiments.

The MDA process needs to be trackable by the MDAS consumer, so that the consumer can build confidence by supervising and when necessary intervening the MDA process. FIG. 5 illustrates an example MDA process.

In FIG. 5 the data preparation entity prepares the (raw) data for analysis. The Data Preparation involves collection of the required data and preparation (e.g., formatting, classification, correlation, etc.) of the collected data to make them ready for analysis. The data includes 1) the raw data (e.g., the data without processing) for the network events and/or status (e.g., performance measurements, Trace/MDT/RLF/RCEF reports, QoE reports, alarms, etc.), 2) the execution reports provided by the MDAS consumer for the actions executed under the instruction of MDAS, and 3) the evaluation results (e.g., KPIs) of the actions executed (by the MDAS consumer). The execution reports and evaluation results are useful for the MDA to train the data analysis model (e.g., ML model) to optimize the accuracy of the output (e.g., analytics report) in conjunction with AI and ML techniques.

The analysis entity analyzes the input data to provide the analytics report. The Analysis is supported by data analysis model (e.g., ML model) in conjunction with AI and ML techniques. The MDA analyses not only the prepared data (see e.g., Data Preparation above), but also takes into account the execution reports and the evaluation results of the actions (executed by the MDAS consumer) to fine-tune the analysis result. The Analysis may be for root cause analysis of ongoing issues, for prevention of potential issues and for prediction of network or service demands. The analytics report provides sufficient information to enable the MDAS consumer to take corresponding actions. The analytics report may include recommended actions for the MDAS consumer to take into account.

The execution entity executes actions (e.g., by the MDAS consumer) corresponding to the analytics report. The executed actions may be generated by the MDAS consumer based on the analytics report, or may be recommended by the analytics report. The execution report is provided back to MDA so that the MDA can take it into account to fine-tune the analysis result. The MDAS consumer could be a SON function, a MF or a human operator. The evaluation entity is evaluates the result of the execution. The execution result can be evaluated by performance measurements, KPIs, QoE reports and/or a human involved test result (e.g., drive test). The MDA uses the evaluation result in conjunction with AI and ML techniques to train the data analysis model to optimize the accuracy of the analysis result.

In various embodiments, the MDA may rely on ML technologies, which may need the consumer to be involved to optimize the accuracy of the MDA results. The MDA process in terms of the interaction with the consumer, when utilizing ML technologies, is shown by FIG. 6.

Figure 6:
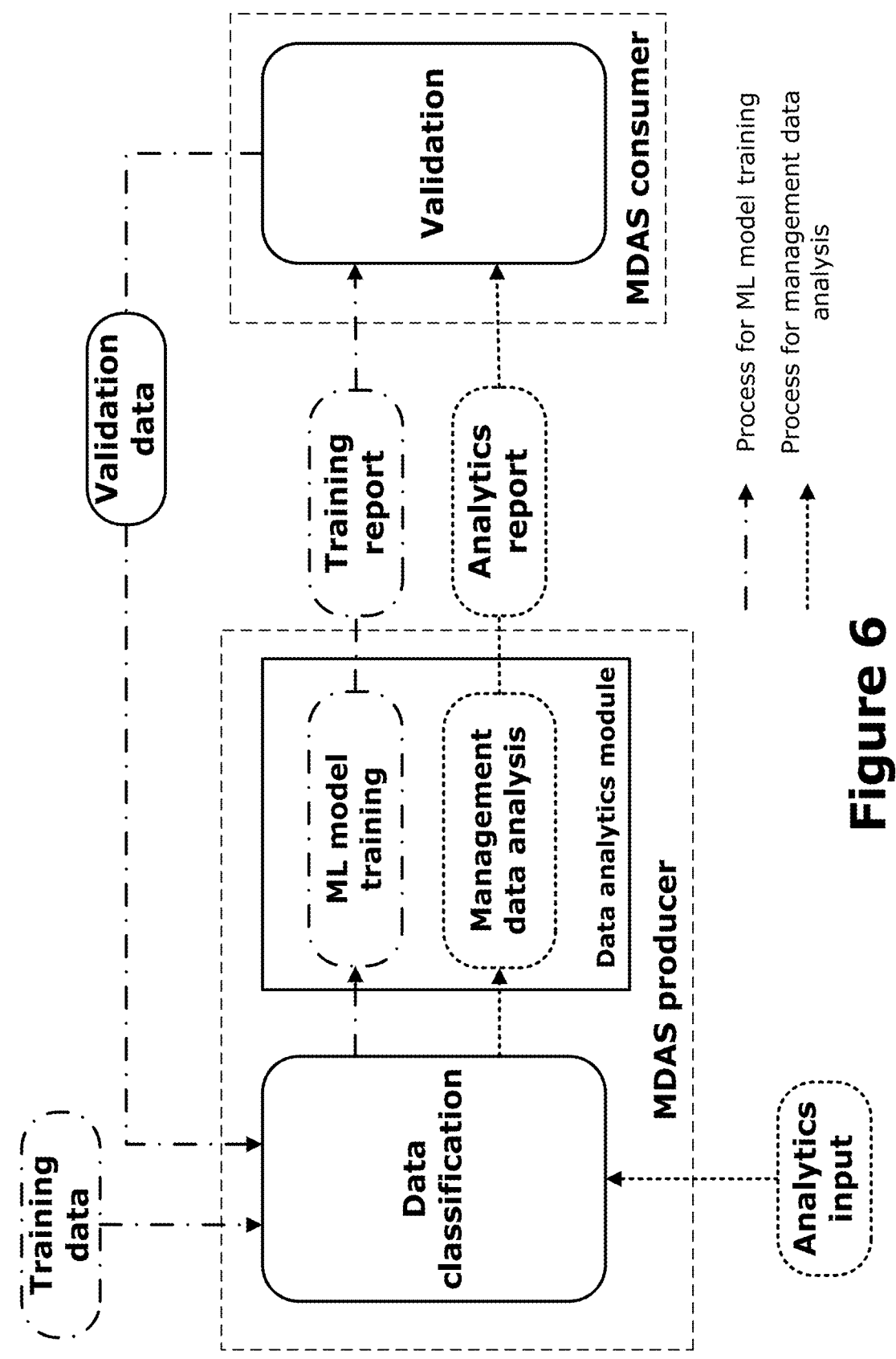

FIG. 6 illustrates another example MDA process according to various embodiments. There are two kinds of processes for MDA, the process for ML model training and the process for management data analysis. In the process for ML model training, the MDA producer classifies the input data for training purpose, trains the ML model and provides the ML training report. The process for ML model training may also get the consumer involved, i.e., allowing the consumer to provide input for ML model training. The ML model training may be performed on an un-trained ML model or a trained ML model. In the process for management data analysis, the MDA producer classifies the analytics input for management data analysis purpose, analyses the data by the trained ML model, and provides the analytics report to the consumer.

In FIG. 6, the data classification entity is the data input to the MDA producer could be used for ML model training or for the actual management data analysis. The MDA producer classifies the input data into the category for ML data training and the category for management data analysis, and passes the classified data along to corresponding step for further processing.

The ML model training entity is the MDAS producer trains the ML model, (i.e., to train the algorithm of the ML model) to be able to provide the expected training output by analysis of the training input. For training the ML model of the MDA process, the consumer provides the training data including training input and the desired output to the MDAS producer. The data for ML model training may be the training data (including the training input and the expected output) and/or the validation data provided by the consumer. After the ML model training, the MDAS producer provides an ML model training report. The MDAS producer provides the ML model training report as one kind of output data to the consumer.

With a trained ML model for MDA, the MDAS producer can analyze the analytics input and generate the analytics report as output data of the analysis to the consumer. The management data analysis entity is the trained ML model analyses the classified data and generates the management data analytics report(s).

Figure 7:
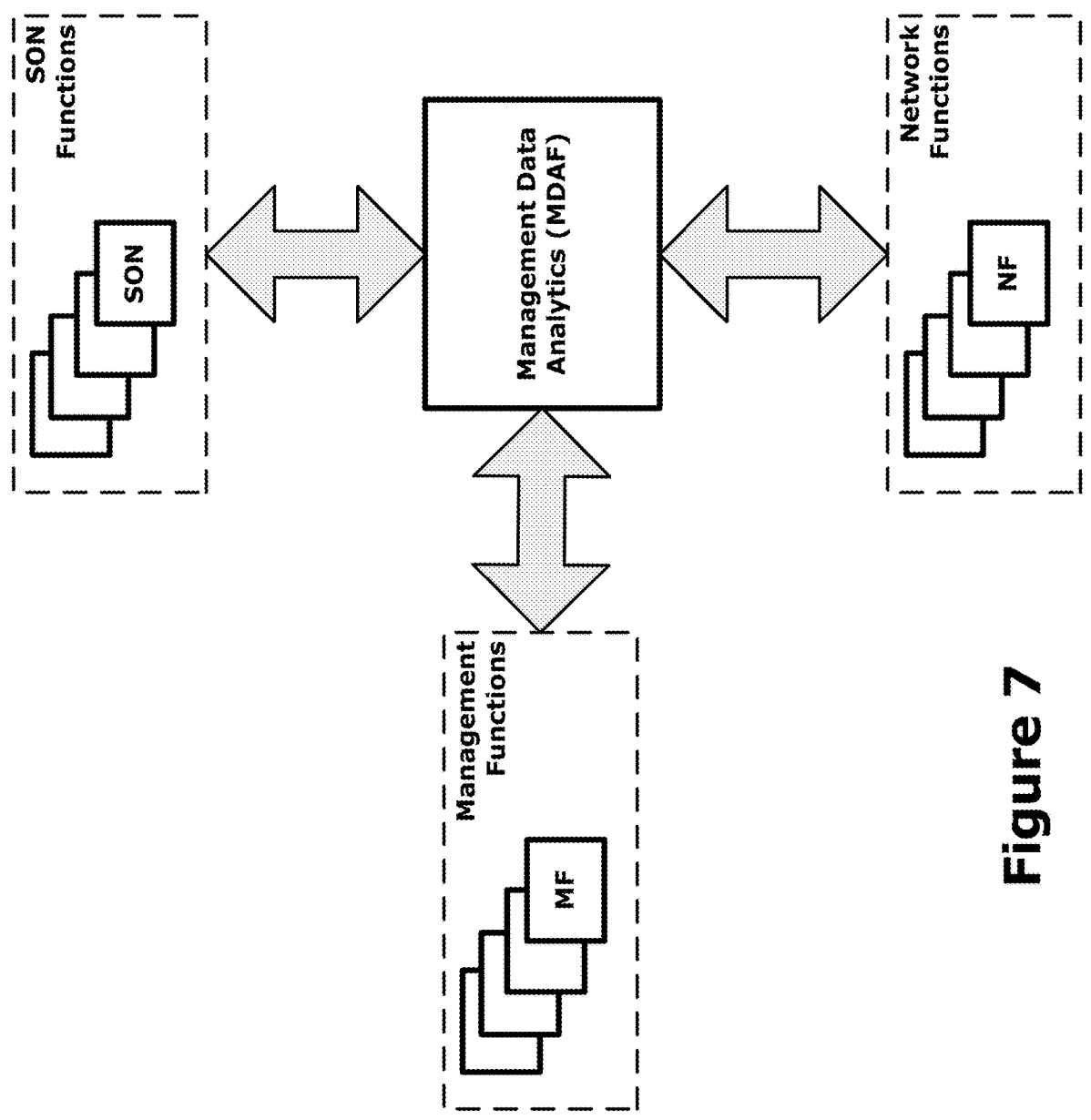
FIG. 7 illustrates an example MDAS and Self-Organizing Network (SON) functions.

The consumer (validation entity) may validate the output data provided by the MDAS producer. The output data to be validated may be the analytics report and/or the ML model training report. The consumer may provide the validation data as feedback to the MDAS producer, and the MDAS producer will use the validation data for further ML model training for MDA with the historical data that are used to generate the validated output data 3.4. Relation Between MDA and SON MDA for 5G networks has been defined in [1] and is also discussed in [3] and [4]. It utilizes both management and network data collected through management services and from network functions (including e.g., service, slicing and/or network functions related data) and makes the corresponding analytics based on the collected information. These analytics services (e.g., MDAS) can be made available and consumed by other management and SON functions. FIG. 7 gives a high level illustration of potential interaction and utilization of the MDAS, including interactions between MFs, SON functions, and NFs via a Management Data Analytics Function (MDAF). In this example, SON functions may utilise the services provided by the management data analytics (e.g., MDAS) to conduct their functionalities and control actions. Other potential interactions between the entities are not shown by FIG. 7.

The MDA and SON functions/elements both contribute to the automation and cognition of network and service management & orchestration. With interworking and interaction between MDA and SON, they can jointly bring seamless automation of network and service operations. The relation between MDA and SON is depicted by FIG. 8.

Figure 8:
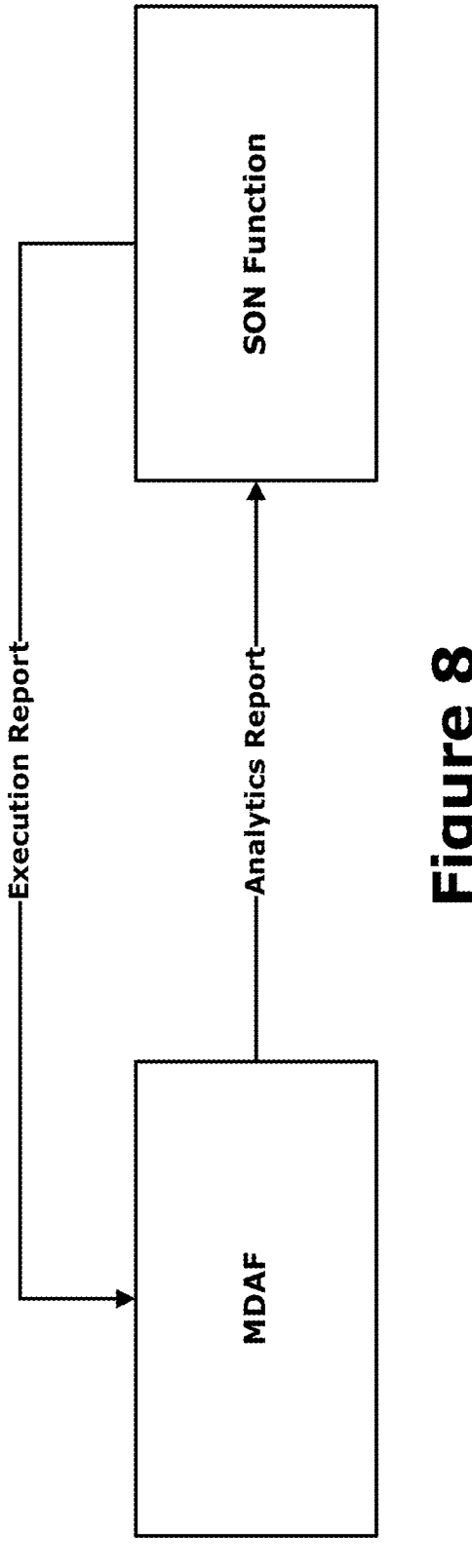
FIG. 8 illustrates an example relation between MDA and SON according to various embodiments.

In FIG. 8, the MDAF provides analytics reports which SON Function can consume. The analytics report may be for an ongoing network or service issue, for prevention of potential issue and for prediction of network or service demands. The analytics report may also include recommended actions for the corresponding ongoing/potential issue and/or prediction. Additionally or alternatively, the MDAF may provide analytical report on capacity planning, resource requirements, resource utilization, resource availability and resource reservation proposals to assist the feasibility check by network and network slice management system before the provisioning of the communication service.

The SON Function may consume the analytics reports provided by the MDAF. The SON Function determines the necessary actions for the corresponding ongoing/potential issue and/or prediction provided in the analytics reports consumed from the MDAF. If the analytics reports include the recommended actions, the SON Function also takes these recommended actions into account. The SON Function executes the actions, and provides the execution reports (containing the description/logs of the taken actions) for the corresponding ongoing/potential issue and/or prediction.

The MDAF consumes the execution reports from the SON Function. The MDAF evaluates (e.g., by performance measurements) the result of the executed actions by the SON Function. The MDAF takes the execution reports consumed from the SON Function and the evaluation results of the executed actions into account to train the analysis model with AI/ML techniques to optimize the accuracy of the next analytics reports.

4. Coverage Related Issues and Root Cause Analysis 4.1. Coverage Issue Analysis 4.1.1. Use Case The coverage issue may cause various UE and network failures and degrade the network performance offered the UEs.

The coverage issue could be a weak coverage, a coverage hole, a pilot pollution, an overshoot coverage, or a DL and UL channel coverage mismatch as described in clause 5.1.1 of 3GPP TS 37.816 v16.0.0 (Jul. 23, 2019). The weak coverage may result in low success rate of random access, paging, RRC connection establishment and handover, low data throughput, more abnormal releases of RRC connection, DRB retainability, QoS flow and/or PDU session resources, and dissatisfied QoE. The coverage hole is a more severe problem and would further lead to the UE out of service in the area.

The 5G related coverage issue may exist only in 5G (e.g., 5G issue only with good coverage provided by other RATs) or exist in all RATs (e.g., no RAT provides good coverage in the area).

Coverage performance should be assured to guarantee user service experience. It is desirable that the coverage issue can be detected by MDA from the various symptoms, together with the geographical and terrain data and the configuration parameters of the RAN.

Once the coverage issue is detected, the MDAF provides the analytics report that precisely describes the coverage issue, and the analytics report needs to contain sufficient information to enable the MDAS consumer (e.g., SON CCO function) to take the remedy actions. The MDAS producer (e.g., MDAF) may also provide the recommended actions to solve the identified coverage issue in the analytics report, so that the MDAS consumer can execute the actions accordingly or by taking the recommended actions into account.

The MDAS producer (e.g., MDAF) is informed when the actions are taken by the MDAS consumer (or MDAS producer) to solve the coverage issue described in the analytics report, so that the MDAF can start evaluating the result of the executed actions.

The MDAS producer (e.g., MDAF) gets the execution reports describing the actions taken by the MDAS consumer, and takes the execution reports into account to fine-tune the accuracy of the future (new or updated) analytics report.

The MDAF also provides update(s) of the analytics report to indicate the status change (e.g., solved, mitigated, or deteriorated) of the coverage issue.

4.1.2. Potential Requirements

REQ-COV_ANA-CON-1: The MDAS producer should have a capability to provide the analytics report describing the coverage issue.

REQ-COV_ANA-CON-2: The analytics report describing the coverage issue should contain the following information:

The identifier of the coverage issue described in the analytics report;

Indication of whether the coverage issue is weak coverage or coverage hole, a pilot pollution, an overshoot coverage, or a DL and UL channel coverage mismatch;

The start time and end time of the coverage issue;

The geographical area and location where the coverage issue exists;

Root cause of the coverage issue;

Whether the coverage issue exists in 5G only or in all RATs; The cells affected by the coverage issue;

The severity level (e.g., critical, medium, or cleared) of the coverage issue;

The recommended actions to solve the coverage issue.

REQ-RCA_COV-CON-1: The MDAS producer (e.g., MDAF) should be able to collect the following management data related to coverage issue with indication of location (see Note 1): Performance measurements; KPIs; MDT/RLC/RCEF reports; QoE reports. Note 1: The indication of location may vary for different kinds of data.

REQ-RCA_COV-CON-2: The MDAS producer (e.g., MDAF) should be able to get the geographical data and terrain data for a deployed RAN (e.g., NG-RAN).

REQ-RCA_COV-CON-3: The MDAS producer (e.g., MDAF) should be able to get the configuration parameters related to coverage of RAN (e.g., NG-RAN).

REQ-RCA_COV-CON-4: The MDAS producer (e.g., MDAF) should be able to provide the analytics report describing the coverage issue.

REQ-RCA_COV-CON-5: The MDAS producer (e.g., MDAF) should be able to provide the following information in the analytics report to describe the coverage issue:

The identifier of the coverage issue described in the analytics report;

Indication of whether the coverage issue is weak coverage or coverage hole; The start time of the coverage issue;

The geographical area and location where the coverage issue exists;

Whether the coverage issue exists in 5G only or in all RATs; The cells affected by the coverage issue;

The severity level (e.g., critical, medium) of the coverage issue;

The recommended actions to solve the coverage issue.

REQ-RCA_COV-CON-6: The MDAF should be able to be informed when the actions are taken by the MDAS consumer (e.g., SON CCO function) to solve the coverage issue described in the analytics report.

REQ-RCA_COV-CON-7: The MDAF should be able to get the execution reports of the actions taken (by the MDAS consumer, e.g., SON CCO function) to solve the coverage issue described in the analytics report.

REQ-RCA_COV-CON-8: The MDAF should be able to provide the update(s) of analytics report to indicate the status change (e.g., solved, mitigated or deteriorated) of the coverage issue.

4.1.3. Possible Solutions 4.1.3.1. Solution Description

The MDAS producer correlates, processes and analyzes the data described in the following subclause within a time period on a regular basis or trigged by events (e.g., the RLF reports) to identify the coverage issue, and provide the analytics reports to describe the identified coverage issues (which could be new issues or the updates of existing issues).

4.1.3.2. Data Required for Coverage Issue Analysis

Table 6.1.1.3.2 describes the data required for coverage issue analysis. In embodiments, the data described by Table 6.1.1.3.2 is the input data used by the MDAS.

TABLE 6.1.1.3.2

| Data category | Required data |
|---|---|
| Performance measurements | Average/distribution of UE reported RSRPs/RSRQs/SINRs of the serving cell when the TA (Timing Advance) or UE rx-tx applied to the UEs is in a specific range; Average/distribution of UE reported RSRPs/RSRQs/SINRs of each neighbour cell when the UE reported RSRPs/RSROs of the serving cell is in a specific range, measured per NCR (neighbour cell relation), per SSB index and per CSI-RS index of each NCR; Number of abnormal releases of DRBs, QoS flows, PDU sessions, and UE contexts in the serving cell measured per SSB index and per CSI-RS index |
| MDT reports | MDT reports containing RSRPs and RSRQs of the serving cell and neighbour cells reported by each UE with anonymous id (e.g., C-RNTI) and location information. |
| RLF reports | RLF reports containing RSRP (s) and RSRQ (s) of the serving cell and neighbour cells reported by each UE with anonymous id (e.g., C-RNTI) and location information. |
| RECF reports | RCEF reports containing RSRP (s) and RSRQ (s) of the serving cell and neighbour cells reported by each UE with anonymous id (e.g., C-RNTI) and location information. |
| UE location reports | UE location information provided by the LCS with the anonymous id (e.g., C-RNTI) which can be used to correlate with the MDT/RLF/RCEF reports. |
| QoE reports | The level of details of QoE reports required in this solution for future study (FFS). |
| Geographical data and terrain data of the RAN | The geographical information (longitude, latitude, altitude) of the deployed RAN (gNBs and eNodeBs, antennas, sector carrier equipments, etc.). The terrain data for the area of the deployed RAN. Editor's note: which MnS provides this kind of data is FFS. |
| Configuration data | The current NRMs containing the attributes affecting the RAN coverage, such as maximum transmission power of the cell, directions and tilts of the antennas or beams, etc. The NRM update reports (notifications or logs) containing the creations or changes of the MOIs (Managed Object Instance) affecting the RAN coverage. |

4.1.3.3. Analytics Report for Coverage Issue

The analytics report describing the coverage issue contains the following information:

Coverage issue identifier: The identifier of the coverage issue;

Coverage issue type indication: Indication that the coverage issue is weak coverage or coverage hole, pilot pollution, overshoot coverage, or DL and UL channel coverage mismatch;

Start time: The start time of the coverage issue;

Stop time: The stop time of the coverage issue;

Location: The geographical area and location where the coverage issue exists;

Root cause: Root cause of the coverage issue, e.g., weak transmission power, blocked by constructions, restricted by terrain, etc;

RAT indication: Indication that the coverage issue exists in 5G only or in all RATs; Affected objects: The MOIs of the cells affected by the coverage issue;

Severity level: The severity level (e.g., critical, medium, cleared) of the coverage issue (Quantification of severity levels is FFS);

Recommended actions: The recommended actions to solve the coverage issue. The recommended action could be re-configurations of coverage related attributes, creation of new cells or beams, or manual operations to add or change the physical units.

5. Example Systems and Device Configurations and Arrangements

Figure 9:
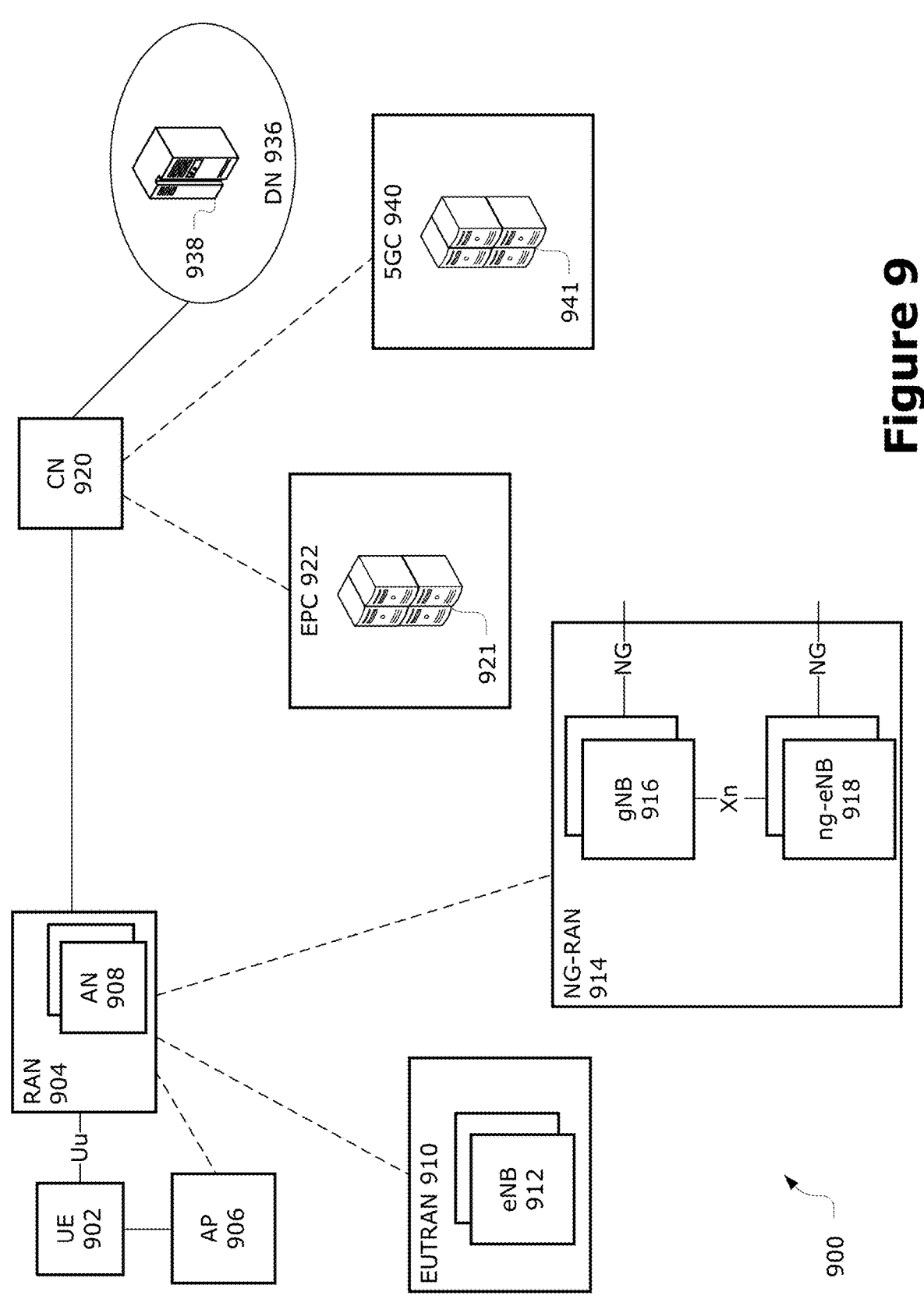
FIG. 9 illustrates an example network architecture according to various embodiments.

Referring now to FIG. 9, which illustrates a network 900 in accordance with various embodiments. The network 900 may operate in a manner consistent with 3GPP technical specifications for Long Term Evolution (LTE) or 5G/NR systems. However, the example embodiments are not limited in this regard and the described embodiments may apply to other networks that benefit from the principles described herein, such as future 3GPP systems, or the like.

The network 900 includes a UE 902, which is any mobile or non-mobile computing device designed to communicate with a RAN 904 via an over-the-air connection. The UE 902 is communicatively coupled with the RAN 904 by a Uu interface, which may be applicable to both LTE and NR systems. Examples of the UE 902 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IOT) device, and/or the like. The network 900 may include a plurality of UEs 902 coupled directly with one another via a D2D, ProSe, PC5, and/or sidelink (SL) interface. These UEs 902 may be M2M/D2D/MTC/IoT devices and/or vehicular systems that communicate using physical SL channels such as, but not limited to, Physical Sidelink Broadcast Channel (PSBCH), Physical Sidelink Discovery Channel (PSDCH), Physical Sidelink Shared Channel (PSSCH), Physical Sidelink Control Channel (PSCCH), Physical Sidelink Feedback Channel (PSFCH), etc.

In some embodiments, the UE 902 may additionally communicate with an AP 906 via an over-the-air (OTA) connection. The AP 906 manages a WLAN connection, which may serve to offload some/all network traffic from the RAN 904. The connection between the UE 902 and the AP 906 may be consistent with any IEEE 802.11 protocol. Additionally, the UE 902, RAN 904, and AP 906 may utilize cellular-WLAN aggregation/integration (e.g., LWA/LWIP). Cellular-WLAN aggregation may involve the UE 902 being configured by the RAN 904 to utilize both cellular radio resources and WLAN resources.

The UE 902 may be configured to perform signal and/or cell measurements based on a configuration obtain from the network (e.g., RAN 904). The UE 902 derives cell measurement results by measuring one or multiple beams per cell as configured by the network. For all cell measurement results, the UE 902 applies layer 3 (L3) filtering before using the measured results for evaluation of reporting criteria and measurement reporting. For cell measurements, the network can configure Reference Signal Received Power (RSRP), Reference Signal Received Quality (RSRQ), and/or Signal-to-Interference plus Noise Ratio (SINR) as a trigger quantity. Reporting quantities can be the same as the trigger quantity or combinations of quantities (e.g., RSRP and RSRQ; RSRP and SINR; RSRQ and SINR; RSRP, RSRQ and SINR). In other embodiments, other measurements and/or combinations of measurements may be used as a trigger quantity such as those discussed in 3GPP TS 36.214 v15.3.0 (Sep. 27, 2018) (hereinafter "[TS36214]"), 3GPP TS 38.215 v15.5.0 (Jun. 24, 2019) (hereinafter "[TS38215]"), Institute of Electrical and Electronics Engineers (IEEE) Standards Association, "IEEE Computer Society: "Part 11: Wireless LAN Medium Access Control (MAC) and Physical Layer (PHY) Specifications", IEEE Std 802.11™-2012 (2012) (hereinafter "[IEEE80211]"), and/or the like.

The RAN 904 includes one or more access network nodes (ANs) 908. The ANs 908 terminate air-interface(s) for the UE 902 by providing access stratum protocols including Radio Resource Control (RRC), Packet Data Convergence Protocol (PDCP), Radio Link Control (RLC), Medium Access Control (MAC), and physical (PHY/L1) layer protocols. In this manner, the AN 908 enables data/voice connectivity between CN 920 and the UE 902. The UE 902 and can be configured to communicate using OFDM communication signals with other UEs 902 or with any of the AN 908 over a multicarrier communication channel in accordance with various communication techniques, such as, but not limited to, an OFDMA communication technique (e.g., for DL communications) or a SC-FDMA communication technique (e.g., for UL and SL communications), although the scope of the embodiments is not limited in this respect. The OFDM signals comprise a plurality of orthogonal subcarriers.

The ANs 908 may be a macrocell base station or a low power base station for providing femtocells, picocells or other like cells having smaller coverage areas, smaller user capacity, or higher bandwidth compared to macrocells; or some combination thereof. In these implementations, an AN 908 be referred to as a BS, gNB, RAN node, eNB, ng-eNB, NodeB, RSU, TRP, etc.

One example implementation is a "CU/DU split" architecture where the ANs 908 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v15.7.0 (Jan. 9, 2020)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 908 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 904 is an LTE RAN or Evolved Universal Terrestrial Radio Access Network (E-UTRAN) 910) or an Xn interface (if the RAN 904 is a NG-RAN 914). The X2/Xn interfaces, which may be separated into control/user plane interfaces in some embodiments, may allow the ANs to communicate information related to handovers, data/context transfers, mobility, load management, interference coordination, etc.

The ANs of the RAN 904 may each manage one or more cells, cell groups, component carriers, etc. to provide the UE 902 with an air interface for network access. The UE 902 may be simultaneously connected with a plurality of cells provided by the same or different ANs 908 of the RAN 904. For example, the UE 902 and RAN 904 may use carrier aggregation (CA) to allow the UE 902 to connect with a plurality of component carriers, each corresponding to a PCell or SCell. A PCell is an MCG cell, operating on a primary frequency, in which the UE 902 performs an initial connection establishment procedure and/or initiates a connection re-establishment procedure. An SCell is a cell providing additional radio resources on top of a Special Cell (SpCell) when the UE 902 is configured with CA. In CA, two or more Component Carriers (CCs) are aggregated. The UE 902 may simultaneously receive or transmit on one or multiple CCs depending on its capabilities. A UE 902 with single timing advance capability for CA can simultaneously receive and/or transmit on multiple CCs corresponding to multiple serving cells sharing the same timing advance (multiple serving cells grouped in one timing advance group (TAG)). A UE 902 with multiple timing advance capability for CA can simultaneously receive and/or transmit on multiple CCs corresponding to multiple serving cells with different timing advances (multiple serving cells grouped in multiple TAGs). The NG-RAN 914 ensures that each TAG contains at least one serving cell; A non-CA capable UE 902 can receive on a single CC and transmit on a single CC corresponding to one serving cell only (one serving cell in one TAG). CA is supported for both contiguous and non-contiguous CCs. When CA is deployed frame timing and SFN are aligned across cells that can be aggregated, or an offset in multiples of slots between the PCell/PSCell and an SCell is configured to the UE 902. In some implementations, the maximum number of configured CCs for a UE 902 is 16 for DL and 16 for UL.

In Dual Connectivity (DC) scenarios, a first AN 908 may be a master node that provides a Master Cell Group (MCG) and a second AN 908 may be secondary node that provides an Secondary Cell Group (SCG). The first and second ANs 908 may be any combination of eNB, gNB, ng-eNB, etc. The MCG is a subset of serving cells comprising the PCell and zero or more SCells. The SCG is a subset of serving cells comprising the PSCell and zero or more SCells. As alluded to previously, DC operation involves the use of PSCells and SpCells. A PSCell is an SCG cell in which the UE 902 performs random access (RA) when performing a reconfiguration with Sync procedure, and an SpCell for DC operation is a PCell of the MCG or the PSCell of the SCG; otherwise the term SpCell refers to the PCell. Additionally, the PCell, PSCells, SpCells, and the SCells can operate in the same frequency range (e.g., FR1 or FR2), or the PCell, PSCells, SpCells, and the SCells can operate in different frequency ranges. In one example, the PCell may operate in a sub-6 GHZ frequency range/band and the SCell can operate at frequencies above 24.25 GHZ (e.g., FR2).

The RAN 904 may provide the air interface over a licensed spectrum or an unlicensed spectrum. To operate in the unlicensed spectrum, the nodes may use LAA, cLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In some embodiments, the RAN 904 may be an E-UTRAN 910 with one or more eNBs 912. The E-UTRAN 910 provides an LTE air interface (Uu) with the following characteristics: subcarrier spacing (SCS) of 15 kHz; cyclic prefix (CP)-OFDM waveform for DL and SC-FDMA waveform for UL; turbo codes for data and TBCC for control; etc. The LTE air interface may rely on channel state information reference signals (CSI-RS) for channel state information (CSI) acquisition and beam management; Physical Downlink Shared Channel (PDSCH)/Physical Downlink Control Channel (PDCCH) Demodulation Reference Signal (DMRS) for PDSCH/PDCCH demodulation; and cell-specific reference signals (CRS) for cell search and initial acquisition, channel quality measurements, and channel estimation for coherent demodulation/detection at the UE. The LTE air interface may operating on sub-6 GHz bands.

In some embodiments, the RAN 904 may be an next generation (NG)-RAN 914 with one or more gNB 916 and/or on or more ng-eNB 918. The gNB 916 connects with 5G-enabled UEs 902 using a 5G NR interface. The gNB 916 connects with a 5GC 940 through an NG interface, which includes an N2 interface or an N3 interface. The ng-eNB 918 also connects with the 5GC 940 through an NG interface, but may connect with a UE 902 via the Uu interface. The gNB 916 and the ng-eNB 918 may connect with each other over an Xn interface.

In some embodiments, the NG interface may be split into two parts, an NG user plane (NG-U) interface, which carries traffic data between the nodes of the NG-RAN 914 and a UPF (e.g., N3 interface), and an NG control plane (NG-C) interface, which is a signaling interface between the nodes of the NG-RAN 914 and an AMF (e.g., N2 interface).

The NG-RAN 914 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase Tracking Reference Signals (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an Synchronization Signal Block (SSB) that is an area of a DL resource grid that includes Primary Synchronization Signal (PSS)/Secondary Synchronization Signal (SSS)/PBCH.

The 5G-NR air interface may utilize bandwidth parts (BWPs) for various purposes. For example, BWP can be used for dynamic adaptation of the SCS. A BWP is a subset of contiguous common resource blocks defined in clause 4.4.4.3 of 3GPP TS 38.211 or a given numerology in a BWP on a given carrier. For example, the UE 902 can be configured with multiple BWPs where each BWP configuration has a different SCS. When a BWP change is indicated to the UE 902, the SCS of the transmission is changed as well. Another use case example of BWP is related to power saving. In particular, multiple BWPs can be configured for the UE 902 with different amount of frequency resources (e.g., PRBs) to support data transmission under different traffic loading scenarios. A BWP containing a smaller number of PRBs can be used for data transmission with small traffic load while allowing power saving at the UE 902 and in some cases at the gNB 916. A BWP containing a larger number of PRBs can be used for scenarios with higher traffic load.

The RAN 904 is communicatively coupled to CN 920, which includes network elements and/or network functions (NFs) to provide various functions to support data and telecommunications services to customers/subscribers (e.g., UE 902). The network elements and/or NFs may be implemented by one or more servers 921, 941. The components of the CN 920 may be implemented in one physical node or separate physical nodes. In some embodiments, NFV may be utilized to virtualize any or all of the functions provided by the network elements of the CN 920 onto physical compute/storage resources in servers, switches, etc. A logical instantiation of the CN 920 may be referred to as a network slice, and a logical instantiation of a portion of the CN 920 may be referred to as a network sub-slice.

The CN 920 may be an LTE CN 922 (also referred to as an Evolved Packet Core (EPC) 922). The EPC 922 may include MME, SGW, SGSN, HSS, PGW, PCRF, and/or other NFs coupled with one another over various interfaces (or "reference points") (not shown). The CN 920 may be a 5GC 940 including an AUSF, AMF, SMF, UPF, NSSF, NEF, NRF, PCF, UDM, AF, and/or other NFS coupled with one another over various service-based interfaces and/or reference points (see e.g., FIGS. 10 and 11). The 5GC 940 may enable edge computing by selecting operator/3rd party services to be geographically close to a point that the UE 902 is attached to the network. This may reduce latency and load on the network. In edge computing implementations, the 5GC 940 may select a UPF close to the UE 902 and execute traffic steering from the UPF to DN 936 via the N6 interface. This may be based on the UE subscription data, UE location, and information provided by the AF, which allows the AF to influence UPF (re)selection and traffic routing.

The data network (DN) 936 may represent various network operator services, Internet access, or third party services that may be provided by one or more servers including, for example, application (app)/content server 938. The DN 936 may be an operator external public, a private PDN, or an intra-operator packet data network, for example, for provision of IMS services. In this embodiment, the server 938 can be coupled to an IMS via an S-CSCF or the I-CSCF. In some implementations, the DN 936 may represent one or more local area DNs (LADNs), which are DNs 936 (or DN names (DNNs)) that is/are accessible by a UE 902 in one or more specific areas. Outside of these specific areas, the UE 902 is not able to access the LADN/DN 936.

Additionally or alternatively, the DN 936 may be an Edge DN 936, which is a (local) Data Network that supports the architecture for enabling edge applications. In these embodiments, the app server 938 may represent the physical hardware systems/devices providing app server functionality and/or the application software resident in the cloud or at an edge compute node that performs server function(s). In some embodiments, the app/content server 938 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 910, 914. For example, the edge compute nodes can provide a connection between the RAN 914 and UPF in the 5GC 940. The edge compute nodes can use one or more NFV instances instantiated on virtualization infrastructure within the edge compute nodes to process wireless connections to and from the RAN 914 and a UPF 1002.

In some implementations, the system 900 may include an SMSF, which is responsible for SMS subscription checking and verification, and relaying SM messages to/from the UE 902 to/from other entities, such as an SMS-GMSC/IWMSC/SMS-router. The SMS may also interact with AMF and UDM for a notification procedure that the UE 902 is available for SMS transfer (e.g., set a UE not reachable flag, and notifying UDM when UE 902 is available for SMS).

Self-Organizing Network (SON) is introduced to reduce the operating expenditure (OPEX) associated with the management of deployments with a relatively large number of nodes. Automation of some network planning, configuration and optimisation processes via the use of SON functions can help the network operator to reduce OPEX by reducing manual involvement in such tasks. There are four different architectures that are possible for implementing various SON use cases including: Centralised SON (where SON algorithms are executed in the OAM system), and Distributed SON (where SON algorithms are executed at the Network Element level. Centralised SON has two variants: NM-Centralised SON (where SON algorithms are executed at the Network Management (NM) level), and EM-Centralised SON (where SON algorithms are executed at the Element Management (EM) level).

The SON functions may include, for example, Load Balancing Optimization (LBO), Handover (HO) Parameter Optimization, Capacity and Coverage Optimization (CCO) including Centralized CCO and Distributed CCO, Random Access (RACH) Optimization, SON coordination, self-establishment and self-configuration of 3GPP NFs including automated software management, Automatic Neighbour Relation (ANR) management (including automatic X2 and Xn setup), PCI Configuration, automatic radio configuration data (ARCF), interference coordination including inter-cell interference coordination, self-healing, SON for Active Antenna System (AAS)-based Deployments, trace and MDT reporting, Mobility Robustness Optimization (MRO), Energy Saving Management (ESM) (including intra-LTE Energy Saving in LTE networks, intra-5G Energy Saving in 5G networks, and Inter-RAT Energy Saving), NSI resource allocation optimization, Automatic NSI creation, Multivendor Plug and Play of NFs, optimization of the quality of communication services, cross-slice network resource optimization, multi-aspect/multi-domain resource optimization, automatic CSI creation as discussed in [2], [TS32500], 3GPP TS 32.522, and/or the like.

Figure 10:
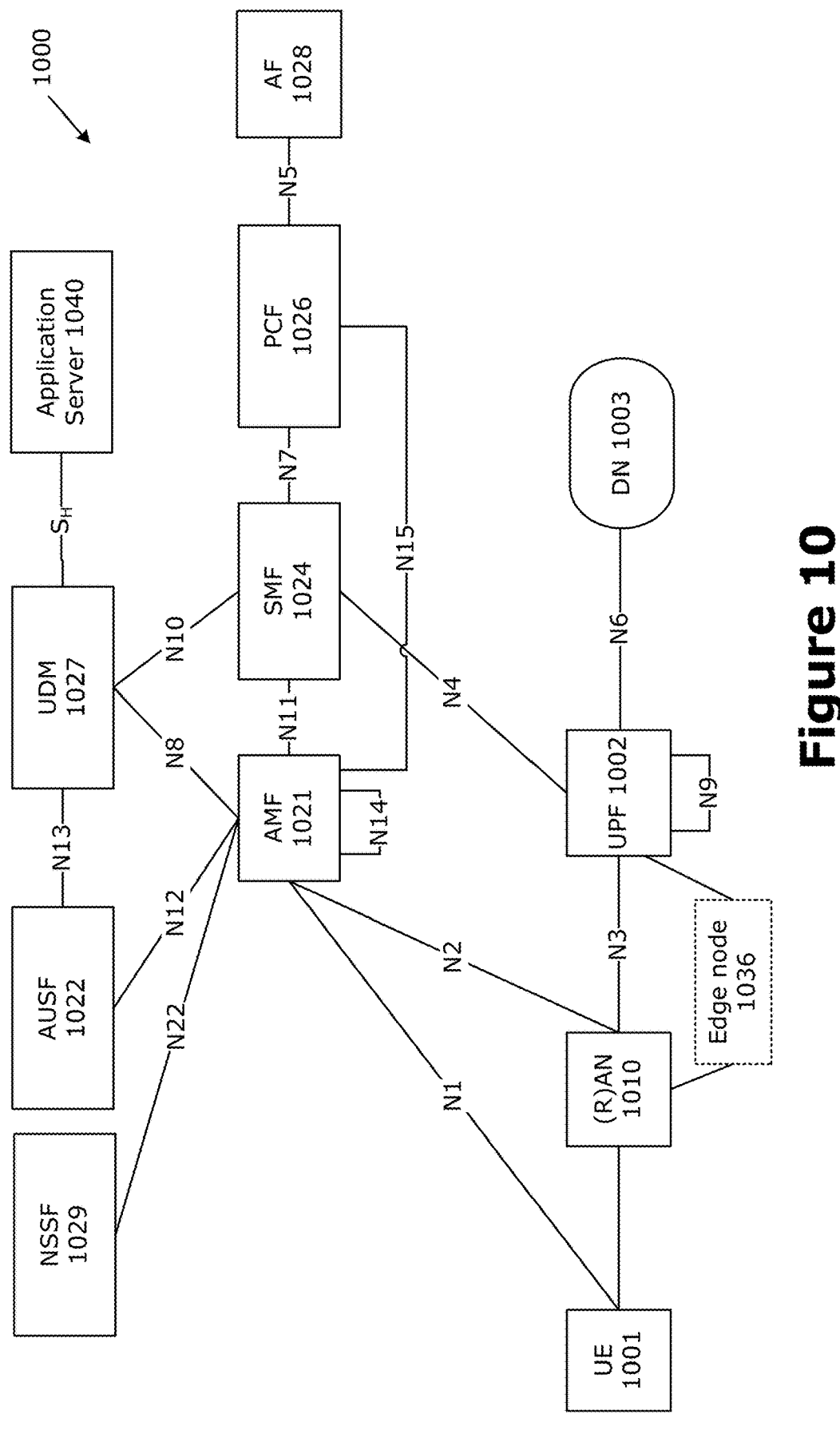
FIGS. 10 and 11 illustrate example core network architectures according to various embodiments.
Figure 11:
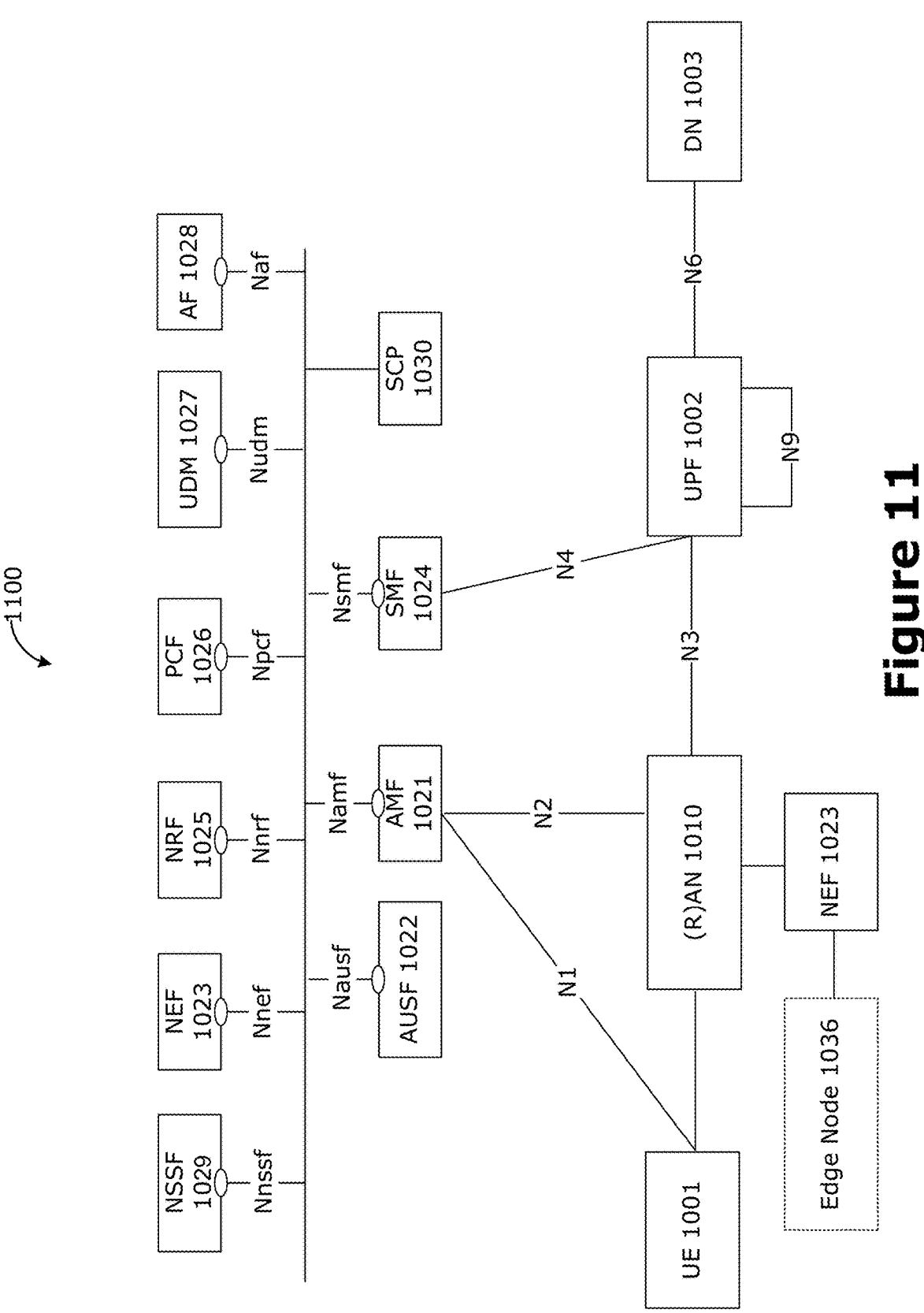

FIGS. 10 and 11 illustrate example system architectures 1000 and 1100 (collectively "5GC 1000") of a 5GC such as CN 940 of FIG. 9, in accordance with various embodiments.

In particular, FIG. 10 shows an exemplary 5G system architecture 1000 in a reference point representation where interactions between NFs are represented by corresponding point-to-point reference points Ni, and FIG. 11 illustrates an exemplary 5G system architecture 1100 in a service-based representation where interactions between NFs are represented by corresponding service-based interfaces. The system 1000 is shown to include a UE 1001, which may be the same or similar to the UEs 902 discussed previously; a (R)AN 1010, which may be the same or similar to the AN 908 discussed previously; and a DN 1003, which may be, for example, operator services, Internet access or 3rd party services, and may correspond with a Packet Data Network in LTE systems; and a 5GC 1020. The 5GC 1020 may include an Access and Mobility Management Function (AMF) 1021; an Authentication Server Function (AUSF) 1022; a Session Management Function (SMF) 1024; a Network Exposure Function (NEF) 1023; a Policy Control Function (PCF) 1026; an NF Repository Function (NRF) 1025; a Unified Data Management (UDM) 1027; an Application Function (AF) 1028; a User Plane Function (UPF) 1002; a Network Slice Selection Function (NSSF) 1029; and a Service Communication Proxy (SCP) 1030.

The reference point representation of FIG. 10 shows various interactions between corresponding NFs. For example, FIG. 10 illustrates the following reference points: N1 (between the UE 1001 and the AMF 1021), N2 (between the RAN 1010 and the AMF 1021), N3 (between the RAN 1010 and the UPF 1002), N4 (between the SMF 1024 and the UPF 1002), N5 (between the PCF 1026 and the AF 1028), N6 (between the UPF 1002 and the DN 1003), N7 (between the SMF 1024 and the PCF 1026), N8 (between the UDM 1027 and the AMF 1021), N9 (between two UPFs 1002), N10 (between the UDM 1027 and the SMF 1024), N11 (between the AMF 1021 and the SMF 1024), N12 (between the AUSF 1022 and the AMF 1021), N13 (between the AUSF 1022 and the UDM 1027), N14 (between two AMFs 1021), N15 (between the PCF 1026 and the AMF 1021 in case of a non-roaming scenario, or between the PCF 1026 and a visited network and AMF 1021 in case of a roaming scenario), N16 (between two SMFs; not shown), and N22 (between AMF 1021 and NSSF 1025). Other reference point representations not shown in FIG. 10 can also be used.

The service-based representation of FIG. 11 represents NFs within the control plane that enable other authorized NFs to access their services. In this regard, 5G system architecture 300 can include the following service-based interfaces: Namf (a service-based interface exhibited by the AMF 1021), Nsmf (a service-based interface exhibited by the SMF 1024), Nnef (a service-based interface exhibited by the NEF 1023), Npcf (a service-based interface exhibited by the PCF 1026), Nudm (a service-based interface exhibited by the UDM 1027), Naf (a service-based interface exhibited by the AF 1028), Nnrf (a service-based interface exhibited by the NRF 1025), Nnssf (a service-based interface exhibited by the NSSF 1029), Nausf (a service-based interface exhibited by the AUSF 1022). Other service-based interfaces (e.g., Nudr, N5g-eir, and Nudsf) not shown in FIG. 11 can also be used. In embodiments, the NEF 1023 can provide an interface to Edge node 1036, which can be used to process wireless connections with the RAN 1010.

The AUSF 1022 stores data for authentication of UE 1001 and handle authentication-related functionality. The AUSF 1022 may facilitate a common authentication framework for various access types. The AUSF 1022 may communicate with the AMF 1021 via an N12 reference point between the AMF 1021 and the AUSF 1022; and may communicate with the UDM 1027 via an N13 reference point between the UDM 1027 and the AUSF 1022. Additionally, the AUSF 1022 may exhibit an Nausf service-based interface.

The AMF 1021 allows other functions of the 5GC 1000 to communicate with the UE 1001 and the RAN 1010 and to subscribe to notifications about mobility events with respect to the UE 1001. The AMF 1021 is also responsible for registration management (e.g., for registering UE 1001), connection management, reachability management, mobility management, lawful interception of AMF-related events, and access authentication and authorization. The AMF 1021 provides transport for SM messages between the UE 1001 and the SMF 1024, and acts as a transparent proxy for routing SM messages. AMF 1021 also provides transport for SMS messages between UE 1001 and an SMSF. AMF 144 interacts with the AUSF 1022 and the UE 1001 to perform various security anchor and context management functions. Furthermore, AMF 1021 is a termination point of a RAN-CP interface, which includes the N2 reference point between the RAN 1010 and the AMF 1021. The AMF 1021 is also a termination point of Non-Access Stratum (NAS) (N1) signaling, and performs NAS ciphering and integrity protection.

The AMF 1021 also supports NAS signaling with the UE 1001 over an N3IWF interface. The N3IWF provides access to untrusted entities. N3IWF may be a termination point for the N2 interface between the (R)AN 1010 and the AMF 1021 for the control plane, and may be a termination point for the N3 reference point between the (R)AN 1010 and the UPF 1002 for the user plane. As such, the AMF 1021 handles N2 signalling from the SMF 1024 and the AMF 1021 for PDU sessions and QoS, encapsulate/de-encapsulate packets for IPSec and N3 tunnelling, marks N3 user-plane packets in the uplink, and enforces QoS corresponding to N3 packet marking taking into account QoS requirements associated with such marking received over N2. N3IWF may also relay UL and DL control-plane NAS signalling between the UE 1001 and AMF 1021 via an N1 reference point between the UE 1001 and the AMF 1021, and relay uplink and downlink user-plane packets between the UE 1001 and UPF 1002. The N3IWF also provides mechanisms for IPsec tunnel establishment with the UE 1001. The AMF 1021 may exhibit an Namf service-based interface, and may be a termination point for an N14 reference point between two AMFs 1040 and an N17 reference point between the AMF 1021 and a 5G-EIR (not shown by FIG. 9).

The SMF 1024 is responsible for SM (e.g., session establishment, tunnel management between UPF 1002 and (R)AN 1010); UE IP address allocation and management (including optional authorization); selection and control of UP function; configuring traffic steering at UPF 1002 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1021 over N2 to (R)AN 1010; and determining SSC mode of a session. SM refers to management of a PDU session, and a PDU session or "session" refers to a PDU connectivity service that provides or enables the exchange of PDUs between the UE 1001 and the DN 1003.

The UPF 1002 acts as an anchor point for intra-RAT and inter-RAT mobility, an external PDU session point of interconnect to data network 1003, and a branching point to support multi-homed PDU session. The UPF 1002 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 1002 may include an uplink classifier to support routing traffic flows to a data network.

The NSSF 1029 selects a set of network slice instances serving the UE 1001. The NSSF 1029 also determines allowed NSSAI and the mapping to the subscribed S-NSSAIs, if needed. The NSSF 1029 also determines an AMF set to be used to serve the UE 1001, or a list of candidate AMFs 1021 based on a suitable configuration and possibly by querying the NRF 1025. The selection of a set of network slice instances for the UE 1001 may be triggered by the AMF 1021 with which the UE 1001 is registered by interacting with the NSSF 1029; this may lead to a change of AMF 1021. The NSSF 1029 interacts with the AMF 1021 via an N22 reference point; and may communicate with another NSSF in a visited network via an N31 reference point (not shown).

The NEF 1023 securely exposes services and capabilities provided by 3GPP NFs for third party, internal exposure/re-exposure, AFs 1028, edge computing or fog computing systems (e.g., edge compute node 1036, etc. In such embodiments, the NEF 1023 may authenticate, authorize, or throttle the AFs. NEF 1023 may also translate information exchanged with the AF 1028 and information exchanged with internal network functions. For example, the NEF 1023 may translate between an AF-Service-Identifier and an internal 5GC information. NEF 1023 may also receive information from other NFs based on exposed capabilities of other NFs. This information may be stored at the NEF 1023 as structured data, or at a data storage NF using standardized interfaces. The stored information can then be re-exposed by the NEF 1023 to other NFs and AFs 1028, or used for other purposes such as analytics.

The NRF 1025 supports service discovery functions, receives NF discovery requests from NF instances, and provides information of the discovered NF instances to the requesting NF instances. NRF 1025 also maintains information of available NF instances and their supported services. The NRF 1025 also supports service discovery functions, wherein the NRF 1025 receives NF Discovery Request from NF instance or an SCP (not shown), and provides information of the discovered NF instances to the NF instance or SCP.

The PCF 1026 provides policy rules to control plane functions to enforce them, and may also support unified policy framework to govern network behavior. The PCF 1026 may also implement a front end to access subscription information relevant for policy decisions in a UDR of the UDM 1027. In addition to communicating with functions over reference points as shown, the PCF 1026 exhibit an Npcf service-based interface.

The UDM 1027 handles subscription-related information to support the network entities' handling of communication sessions, and stores subscription data of UE 1001. For example, subscription data may be communicated via an N8 reference point between the UDM 1027 and the AMF 1021. The UDM 1027 may include two parts, an application front end and a UDR. The UDR may store subscription data and policy data for the UDM 1027 and the PCF 1026, and/or structured data for exposure and application data (including PFDs for application detection, application request information for multiple UEs 1001) for the NEF 1023. The Nudr service-based interface may be exhibited by the UDR 221 to allow the UDM 1027, PCF 1026, and NEF 1023 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1027 may exhibit the Nudm service-based interface.

The AF 1028 provides application influence on traffic routing, provide access to NEF 1023, and interact with the policy framework for policy control. The AF 1028 may influence UPF 1002 (re)selection and traffic routing. Based on operator deployment, when AF 1028 is considered to be a trusted entity, the network operator may permit AF 1028 to interact directly with relevant NFs.

Additionally, the AF 1028 may be used for edge computing implementations. The 5GC 1000 may enable edge computing by selecting operator/3rd party services to be geographically close to a point that the UE 1001 is attached to the network. This may reduce latency and load on the network. In edge computing implementations, the 5GC 1000 may select a UPF 1002 close to the UE 902 and execute traffic steering from the UPF 1002 to DN 1003 via the N6 interface. This may be based on the UE subscription data, UE location, and information provided by the AF 1028, which allows the AF 1028 to influence UPF (re)selection and traffic routing.

The DN 1003 may represent various network operator services, Internet access, or third party services that may be provided by one or more servers including, for example, application (app)/content server 1040. The DN 1003 may be an operator external public, a private PDN, or an intra-operator packet data network, for example, for provision of IMS services. In this embodiment, the app server 1040 can be coupled to an IMS via an S-CSCF or the I-CSCF. In some implementations, the DN 1003 may represent one or more local area DNS (LADNs), which are DNs 1003 (or DN names (DNNs)) that is/are accessible by a UE 1001 in one or more specific areas. Outside of these specific areas, the UE 1001 is not able to access the LADN/DN 1003.

In some implementations, the DN 1003 may be, or include, one or more edge compute nodes 1036. Additionally or alternatively, the DN 1003 may be an Edge DN 1003, which is a (local) Data Network that supports the architecture for enabling edge applications. In these embodiments, the app server 1040 may represent the physical hardware systems/devices providing app server functionality and/or the application software resident in the cloud or at an edge compute node 1036 that performs server function(s). In some embodiments, the app/content server 1040 provides an edge hosting environment that provides support required for Edge Application Server's execution.

In some embodiments, the 5GS can use one or more edge compute nodes 1036 to provide an interface and offload processing of wireless communication traffic. In these embodiments, the edge compute nodes 1036 may be included in, or co-located with one or more RANs 1010. For example, the edge compute nodes 1036 can provide a connection between the RAN 1010 and UPF 1002 in the 5GC 1000. The edge compute nodes 1036 can use one or more NFV instances instantiated on virtualization infrastructure within the edge compute nodes 1036 to process wireless connections to and from the RAN 1010 and UPF 1002.

In embodiments, the edge node 1036 may include or be part of an edge system (or edge network). The edge node 1036 may also be referred to as "edge hosts 1036" or "edge servers 1036." The edge system includes a collection of edge servers 1036 and edge management systems (not shown) necessary to run edge computing applications within an operator network or a subset of an operator network. The edge servers 1036 are physical computer systems that may include an edge platform and/or virtualization infrastructure, and provide compute, storage, and network resources to edge computing applications. Each of the edge servers 1036 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 901, 1001 The VI of the edge servers 1036 provide virtualized environments and virtualized resources for the edge hosts, and the edge computing applications may run as VMs and/or application containers on top of the VI. Various edge computing/networking technologies in various combinations and layouts of devices located at the edge of a network may be used. Examples of such edge computing/networking technologies that may implement the embodiments herein include ETSI MEC; CDNs Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

The SCP 1030 (or individual instances of the SCP 1030) supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., 3GPP TS 23.501 section 6.3). Load balancing, monitoring, overload control functionality provided by the SCP may be implementation specific. The SCP 230 may be deployed in a distributed manner. More than one SCP 1030 can be present in the communication path between various NF Services. The SCP 1030, although not an NF instance, can also be deployed distributed, redundant, and scalable.

The system architecture 1000/1100 may also include other elements that are not shown by FIG. 10 or 11, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIGS. 10-11). Individual NFs may share a UDSF for storing their respective unstructured data or individual NFs may each have their own UDSF located at or near the individual NFs. Additionally, the UDSF may exhibit an Nudsf service-based interface (not shown by FIGS. 10-11). The 5G-EIR may be an NF that checks the status of PEI for determining whether particular equipment/entities are black-listed from the network; and the SEPP may be a non-transparent proxy that performs topology hiding, message filtering, and policing on inter-PLMN control plane interfaces.

In another example, the 5G system architecture 1000 includes an IP multimedia subsystem (IMS) as well as a plurality of IP multimedia core network subsystem entities, such as call session control functions (CSCFs) (not shown by FIG. 10 or 11). More specifically, the IMS includes a CSCF, which can act as a proxy CSCF (P-CSCF), a serving CSCF (S-CSCF), an emergency CSCF (E-CSCF), or inter-rogating CSCF (I-CSCF). The P-CSCF can be configured to be the first contact point for the UE 1001 within the IMS. The S-CSCF can be configured to handle the session states in the network, and the E-CSCF can be configured to handle certain aspects of emergency sessions such as routing an emergency request to the correct emergency center or public safety answering point (PSAP). The I-CSCF can be config-ured to function as the contact point within an operator's network for all IMS connections destined to a subscriber of that network operator, or a roaming subscriber currently located within that network operator's service area. In some aspects, the I-CSCF can be connected to another IP multi-media network, for example, an IMS operated by a different network operator.

Additionally, there may be many more reference points and/or service-based interfaces between the NF services in the NFs; however, these interfaces and reference points have been omitted from FIGS. 10 and 11 for clarity. In one example, the CN 1020 may include an Nx interface, which is an inter-CN interface between the MME and the AMF 1021 in order to enable interworking between system 200 and an EPC. Other example interfaces/reference points may include an N5g-EIR service-based interface exhibited by a 5G-EIR, an N27 reference point between the NRF in the visited network and the NRF in the home network; and an N31 reference point between the NSSF in the visited net-work and the NSSF in the home network.

Figure 12:
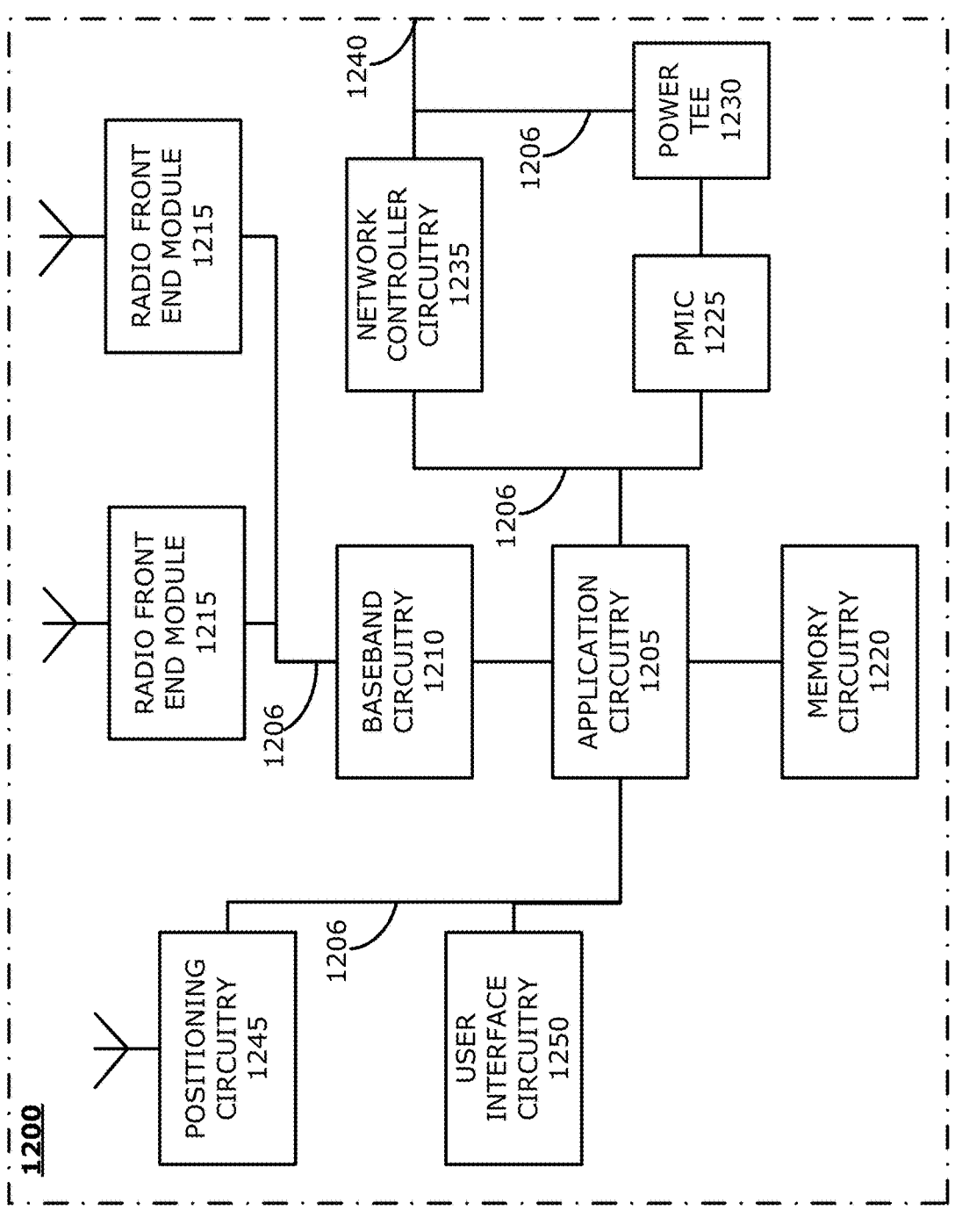
FIG. 12 illustrates an example of infrastructure equipment in accordance with various embodiments.

FIG. 12 illustrates an example of infrastructure equipment 1200 in accordance with various embodiments. The infra-structure equipment 1200 (or "system 1200") may be imple-mented as a base station, radio head, RAN node such as the AN 908 shown and described previously, application server(s) 938, and/or any other element/device discussed herein. In other examples, the system 1200 could be imple-mented in or by a UE 901.

The system 1200 includes application circuitry 1205, baseband circuitry 1210, one or more radio front end mod-ules (RFEMs) 1215, memory circuitry 1220, power man-agement integrated circuitry (PMIC) 1225, power tee cir-cuitry 1230, network controller circuitry 1235, network interface connector 1240, satellite positioning circuitry 1245, and user interface 1250. In some embodiments, the device 1200 may include additional elements such as, for example, memory/storage, display, camera, sensor, or input/output (I/O) interface. In other embodiments, the compo-nents described below may be included in more than one device. For example, said circuitries may be separately included in more than one device for CRAN, vBBU, or other like implementations.

Application circuitry 1205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry x05 may be coupled with or may include memory/storage elements and may be configured to execute instruc-tions stored in the memory/storage to enable various appli-cations or operating systems to run on the system 1200. In some implementations, the memory/storage elements may be on-chip memory circuitry, which may include any suit-able volatile and/or non-volatile memory, such as DRAM, SRAM, EPROM, EEPROM, Flash memory, solid-state memory, and/or any other type of memory device technol-ogy, such as those discussed herein.

The processor(s) of application circuitry 1205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruc-tion set computing (CISC) processors, one or more digital signal processors (DSP), one or more FPGAs, one or more PLDs, one or more ASICs, one or more microprocessors or controllers, or any suitable combination thereof. In some embodiments, the application circuitry 1205 may comprise, or may be, a special-purpose processor/controller to operate according to the various embodiments herein. As examples, the processor(s) of application circuitry 1205 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1200 may not utilize application circuitry 1205, and instead may include a special-purpose processor/con-troller to process IP data received from an EPC or 5GC, for example.

In some implementations, the application circuitry 1205 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-program-mable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1205 may comprise logic blocks or logic fabric, and other interconnected resources that may be programmed to perform various functions, such as the procedures, methods, functions, etc. of the various embodiments discussed herein. In such embodiments, the circuitry of application circuitry 1205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1210 may be implemented, for example, as a solder-down substrate including one or more integrated circuits, a single packaged integrated circuit soldered to a main circuit board or a multi-chip module containing two or more integrated circuits.

User interface circuitry 1250 may include one or more user interfaces designed to enable user interaction with the system 1200 or peripheral component interfaces designed to enable peripheral component interaction with the system 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array of FIG. 13 infra), and the RFEM may be connected to multiple antennas. In alternative implementations, both mmWave and sub-mmWave radio functions may be implemented in the same physical RFEM 1215, which incorporates both mmWave antennas and sub-mmWave.

The memory circuitry 1220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1220 may be implemented as one or more of solder down packaged integrated circuits, socketed memory modules and plug-in memory cards.

The PMIC 1225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1230 provides for electrical power to be drawn from a network cable to provide both power supply and data connectivity to the infrastructure equipment 1200 using a single cable.

The network controller circuitry 1235 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1200 via network interface connector 1240 using a physical connection, which may be electrical (commonly referred to as a "copper interconnect"), optical, or wireless. The network controller circuitry 1235 may include one or more dedicated processors and/or FPGAs to communicate using one or more of the aforementioned protocols. In some implementations, the network controller circuitry 1235 may include multiple controllers to provide connectivity to other networks using the same or different protocols.

The positioning circuitry 1245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1245 may include a Micro-Technology for Positioning, Navigation, and Timing (Micro-PNT) IC that uses a master timing clock to perform position tracking/estimation without GNSS assistance. The positioning circuitry 1245 may also be part of, or interact with, the baseband circuitry 1210 and/or RFEMs 1215 to communicate with the nodes and components of the positioning network. The positioning circuitry 1245 may also provide position data and/or time data to the application circuitry 1205, which may use the data to synchronize operations with various infrastructure (e.g., AN 908, etc.), or the like.

The components shown by FIG. 12 may communicate with one another using interface circuitry, which may include any number of bus and/or interconnect (IX) technologies such as ISA, extended ISA, I2C, SPI, point-to-point interfaces, power management bus (PMBus), PCI, PCIe, PCIx, Intel® UPI, Intel® IAL, Intel® CXL, CAPI, Open-CAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 13:
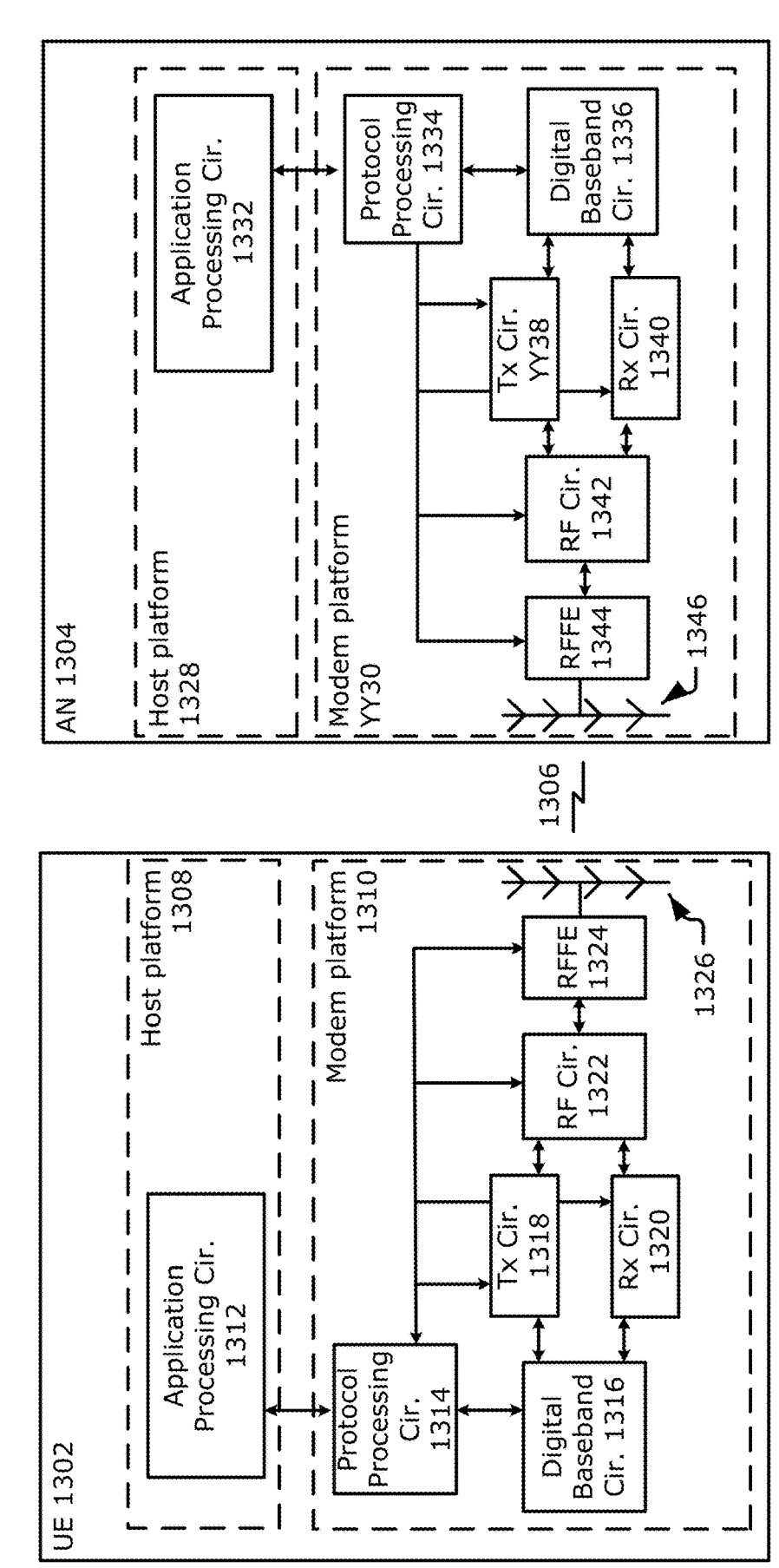
FIG. 13 schematically illustrates a wireless network in accordance with various embodiments.

FIG. 13 schematically illustrates a wireless network 1300 in accordance with various embodiments. The wireless network 1300 includes a UE 1302 in wireless communication with an AN 1304. The UE 1302 and AN 134 may be the same, similar to, and/or substantially interchangeable with, like-named components described elsewhere herein such as the UE 1001 and RAN 904 of FIG. 9, and/or system 1200 of FIG. 12.

The UE 1302 may be communicatively coupled with the AN 1304 via connection 1306. The connection 1306 is illustrated as an air interface to enable communicative coupling, and can be consistent with cellular communications protocols such as an LTE protocol or a 5G NR protocol operating at mmWave or sub-6 GHZ frequencies.

The UE 1302 may include a host platform 1308 coupled with a modem platform 1310. The host platform 1308 may include application processing circuitry 1312, which may be coupled with protocol processing circuitry 1314 of the modem platform 1310. The application processing circuitry 1312 may run various applications for the UE 1302 that source/sink application data. The application processing circuitry 1312 may further implement one or more layer operations to transmit/receive application data to/from a data network. These layer operations may include transport (for example UDP) and Internet (for example, IP) operations The protocol processing circuitry 1314 may implement one or more of layer operations to facilitate transmission or reception of data over the connection 1306. The layer operations implemented by the protocol processing circuitry 1314 may include, for example, MAC, RLC, PDCP, RRC and NAS operations.

The modem platform 1310 may further include digital baseband circuitry 1316 that may implement one or more layer operations that are "below" layer operations performed by the protocol processing circuitry 1314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1310 may further include transmit circuitry 1318, receive circuitry 1320, RF circuitry 1322, and RF front end (RFFE) 1324, which may include or connect to one or more antenna panels 1326. Briefly, the transmit circuitry 1318 may include a digital-to-analog converter, mixer, intermediate frequency (IF) components, etc.; the receive circuitry 1320 may include an analog-to-digital converter, mixer, IF components, etc.; the RF circuitry 1322 may include a low-noise amplifier, a power amplifier, power tracking components, etc.; RFFE 1324 may include filters (for example, surface/bulk acoustic wave filters), switches, antenna tuners, beamforming components (for example, phase-array antenna components), etc. The selection and arrangement of the components of the transmit circuitry 1318, receive circuitry 1320, RF circuitry 1322, RFFE 1324, and antenna panels 1326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1314 may include one or more instances of control circuitry (not shown) to provide control functions for the transmit/receive components.

A UE reception may be established by and via the antenna panels 1326, RFFE 1324, RF circuitry 1322, receive circuitry 1320, digital baseband circuitry 1316, and protocol processing circuitry 1314. In some embodiments, the antenna panels 1326 may receive a transmission from the AN 1304 by receive-beamforming signals received by a plurality of antennas/antenna elements of the one or more antenna panels 1326.

A UE transmission may be established by and via the protocol processing circuitry 1314, digital baseband circuitry 1316, transmit circuitry 1318, RF circuitry 1322, RFFE 1324, and antenna panels 1326. In some embodiments, the transmit components of the UE 1304 may apply a spatial filter to the data to be transmitted to form a transmit beam emitted by the antenna elements of the antenna panels 1326.

Similar to the UE 1302, the AN 1304 may include a host platform 1328 coupled with a modem platform 1330. The host platform 1328 may include application processing circuitry 1332 coupled with protocol processing circuitry 1334 of the modem platform 1330. The modem platform may further include digital baseband circuitry 1336, transmit circuitry 1338, receive circuitry 1340, RF circuitry 1342, RFFE circuitry 1344, and antenna panels 1346. The components of the AN 1304 may be similar to and substantially interchangeable with like-named components of the UE 1302. In addition to performing data transmission/reception as described above, the components of the AN 1308 may perform various logical functions that include, for example, RNC functions such as radio bearer management, uplink and downlink dynamic radio resource management, and data packet scheduling.

Although not shown, the components of UE 1302 and/or AN 1304 may communicate with one another using a suitable bus or interconnect (IX) technology, which may include any number of technologies, including ISA, extended ISA, I2C, SPI, point-to-point interfaces, power management bus (PMBus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX technology may be a proprietary bus, for example, used in an SoC based system.

Figure 14:
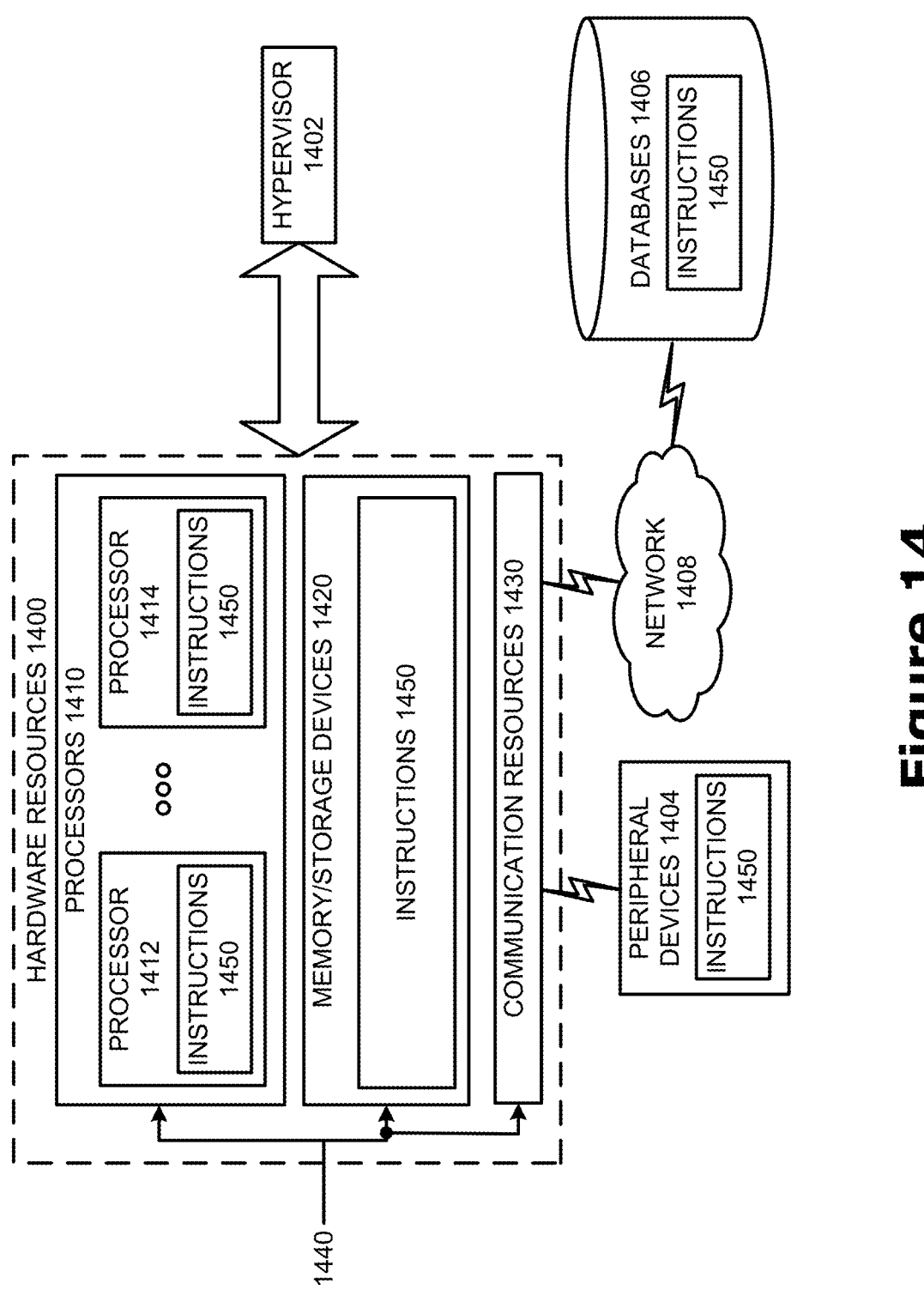
FIG. 14 illustrates components able to read instructions from a machine-readable or computer-readable medium (e.g., a non-transitory machine-readable storage medium) and perform any of the methodologies discussed herein.

FIG. 14 illustrates components, according to some examples, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/subslices to utilize the hardware resources 1400.

The processors 1410 may include, for example, a processor 1412 and a processor 1414. The processor(s) 1410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1420 may include main memory, disk storage, or any suitable combination thereof. The memory/storage devices 1420 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via USB), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 650 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

6. Network Function Virtualization Management and Orchestration Architecture

Figure 15:
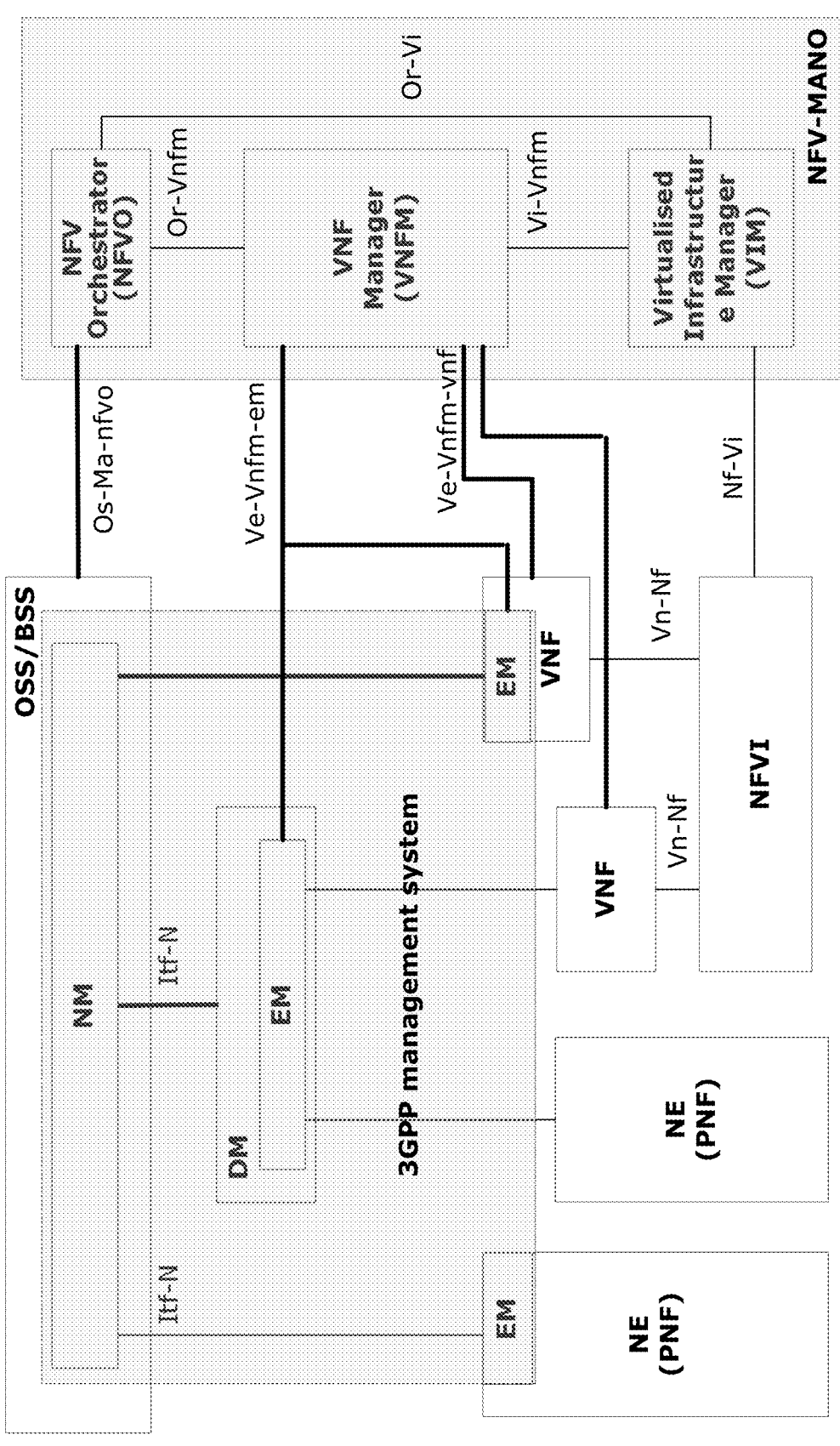
FIG. 15 illustrates an example management architecture of mobile networks that include virtualized network functions.

FIG. 15 depicts an example management architecture of mobile networks that include virtualized network functions. The management architecture of FIG. 15 is a 3GPP management and ETSI Network Function Virtualization (NFV) Management and Orchestration (MANO) architecture. The 3GPP management system of FIG. 15 is based on 4G networks, but aspects of the management system may be applicable to 5G networks.

The mobile network comprises physical and virtualized network elements. Application-specific aspects of both Virtualized Network Functions (VNFs) and Physical Network Functions (PNFs), corresponding to physical network elements (PNEs), are managed by the 3GPP management system.

In FIG. 15, the Itf-N is an interface between the Network Manager (NM) and the domain manager (DM)/element manager (EM), the Os-Ma-nfvo is the reference point between the Operations Support System (OSS)/Business Support System (BSS) (e.g., the NM) and the NFV Orchestrator (NFVO), the Ve-Vnfm-em is the reference point between the EM and the VNFM, and the Ve-Vnfm-vnf is the reference point between the VNF and the VNF Manager (VNFM).

The NFV Infrastructure (NFVI) comprises hardware and software components that together provide the infrastructure resources where VNFs are deployed. The infrastructure resources contain the hardware resources, virtualization layer software and the virtualized resources which the VNF relies on. NFVI resources under consideration are both virtualised and non-virtualised resources, supporting virtualised network functions and partially virtualised network functions.

Virtualised resources in-scope are those that can be associated with virtualisation containers, and have been catalogued and offered for consumption through appropriately abstracted services, for example, compute including machines (e.g., hosts or bare metal), and virtual machines, as resources that comprise both compute (CPU) and memory; storage, including: volumes of storage at either block or file-system level; and network, including: networks, subnets, ports, addresses, links and forwarding rules, for the purpose of ensuring intra- and inter-VNF connectivity.

The NM plays one of the roles of OSS/BSS and is the consumer of reference point Os-Ma-nfvo. The NM provides the functions for the management of mobile network which includes virtualized network functions. The NM supports FCAPS management functions of the mobile network (e.g., IMS, EPC, 5GS, etc.) and 3GPP service (e.g., data service, voice service) and supports the management of mobile network lifecycle. NM initiates the lifecycle management of ETSI-defined NS and VNF, which are related to mobile network, through interaction with NFV-MANO. The NM provides a package of end-user functions with the responsibility for the management of a network, which may include network elements with VNFs, non-virtualized network functions, or both (management of the VNFs may occur via the EM).

The EM and/or DM is responsible for FCAPS management functionality for VNFs on an application level and physical NE on a domain and element level. This mainly includes: fault management for VNFs and physical NEs; configuration management for VNF and physical NE; accounting management for VNFs and physical NEs; performance measurement and collection for VNF and physical NE; and security management for VNF and physical NEs. The EM/DM participates in lifecycle management functionality for a VNF, such as by requesting a lifecycle management operation for a VNF to VNFM, and exchanging information regarding the VNF and Virtualized Resources associated with the VNF. The DM/EM (including EM extended functionality) can manage both PNF(s) and VNF(s). The tracking of data from the VNFM and the EM may comprise, for example, PM data used by the VIM or the NFVI. Both the VNFM and the EM The tracking data from the VNFM and the EM may comprise, for example, PM data used by the VIM or the NFVI. Both the VNFM and the EM can scale up/down the quantity of VNFs of the system XY00. can scale up/down the quantity of VNFs of the system.

The NFV-MANO comprises an NFV Orchestrator (NFVO), VNF Manager (VNFM), and VIM. The NFVO and VNFM share interfaces with the NM, DM/EM and VNF. The NFVO is responsible for the orchestration of NFVI resources across multiple VIMs, fulfilling the Resource Orchestration functions, and the lifecycle management of Network Services, fulfilling the Network Service Orchestration functions. The NFVO coordinates, authorizes, releases, and engages resources of the NFVI in order to provide the requested service(s) (e.g., to execute an NF, AF, component, and/or slice).

The management and orchestration of virtualised resources includings handing NFVI resources (e.g., in NFVI Nodes), in NFVI Points of Presence (NFVI-PoPs). Management of non-virtualised resources is restricted to provisioning connectivity to PNFs, necessary when a NS instance includes a PNF that needs to connect to a VNF, or when the NS instance is distributed across multiple NFVI-Point of Presence (PoPs) or Network-PoPs (N-PoPs).

The virtualised resources are leveraged for providing VNFs with the resources they need. Resource allocation in the NFVI is a potentially complex task because a lot of requirements and constraints may need to be met at the same time. Particularly requirements for network allocation add new complexity compared to known resource allocation strategies for computing resources in virtualised environments. For example, some VNFs require low latency or high bandwidth links to other communication endpoints.

Allocation and release of resources is a dynamic process, in response to consumption of those services by other functions. While the management and orchestrations function for virtualised infrastructure are VNF-unaware, resource allocations and releases may be needed throughout the VNF lifetime. An advantage of NFV is that with increasing load VNFs can dynamically consume services that allocate additional resource when scaling-out is triggered.

Services exposing virtualised resources include (non-exhaustive list): discovery of available services; management of virtualised resources availability/allocation/release; and virtualised resource fault/performance management.

In the case of virtualised resources distributed across multiple NFVI-PoPs, those services could either be exposed directly by the management and orchestration functions for each individual NFVI-POP, or via a higher-level service abstraction presenting the virtualised resources across multiple NFVI-PoPs. Both types of services could be exposed to the consuming functions. In the case of the higher level service abstraction previously mentioned, the management and orchestration of virtualised resources and non-virtualised networking resources across those NFVI-PoPs falls under the responsibility of the management and orchestration of the virtualised infrastructure that may in turn use the services exposed directly by the management and orchestration functions of a single or across multiple NFVI-PoPs. In order to provide those services, the management and orchestration of the virtualised infrastructure consumes services provided by the NFVI.

The NFV management and orchestration functions that coordinate virtualised resources in a single NFVI-POP and/or across multiple NFVI-PoPs need to ensure exposure of services that support accessing these resources in an open, well known abstracted manner. These services can be consumed by other authenticated and properly authorized NFV management and orchestration functions (e.g., functions that manage and orchestrate virtualised network functions).

Network Service Licecycle management includes, inter alia, on-boarding Network Service, e.g., register a Network Service in the catalogue and ensure that all the templates describing the NS are on-boarded; instantiating Network Service, e.g., create a Network Service using the NS on-boarding artefacts; scaling Network Service, e.g., grow or reduce the capacity of the Network Service; updating Network Service by supporting Network Service configuration changes of various complexity such as changing inter-VNF connectivity or the constituent VNF instances. Performing create, delete, query, and update procedures for VNFFGs associated to a Network Service; and terminating Network Services, e.g., request the termination of constituent VNF instances, request the release of NFVI resources associated to NSs, and return them to NFVI resource pool if applicable.

The deployment and operational behaviour requirements of each Network Service is captured in a deployment template, and stored during the Network Service on-boarding process in a catalogue, for future selection for instantiation. The deployment template fully describes the attributes and requirements necessary to realize such a Network Service. Network Service Orchestration coordinates the lifecycle of VNFs that jointly realize a Network Service. This includes (not limited to) managing the associations between different VNFs, and when applicable between VNFs and PNFs, the topology of the Network Service, and the VNFFGs associated with the Network Service.

During the Network Service lifecycle, the Network Service Orchestration functions may monitor KPIs of a Network Service if such requirements were captured in the deployment template, and may report this information to support explicit request for such operations from other functions.

The Network Service Orchestration performs its services by using the VNF Management services and by orchestrating the NFV Infrastructure that supports the interconnection between VNFs functionality, and its functions are exposed in an open, well known abstracted manner as services to other functions. In order to fulfil its responsibilities, the Network Service Orchestration functions consume services exposed by other functions (e.g., Virtualised Infrastructure Management functions).

The services provided by Network Service Orchestration can be consumed by authenticated and properly authorized other functions (e.g., OSS, BSS). The VNFM is responsible for the lifecycle management of VNF instances. Each VNF instance is assumed to have an associated VNF Manager. The VNF manager may be assigned the management of a single VNF instance, or the management of multiple VNF instances of the same type or of different types. Most of the VNFM functions are assumed to be generic common functions applicable to any type of VNF. However, the NFV-MANO architectural framework needs to also support cases where VNF instances need specific functionality for their lifecycle management, and such functionality may be specified in the VNF Package.

The VNFs are used to execute EPC/5GC components/functions. The VNFs are configured to perform VNF instantiation, including VNF configuration if required by the VNF deployment template (e.g., VNF initial configuration with IP addresses before completion of the VNF instantiation operation); VNF instantiation feasibility checking; VNF instance software update/upgrade; VNF instance modification; VNF instance scaling out/in and up/down; VNF instance-related collection of NFVI performance measurement results and faults/events information, and correlation to VNF instance-related events/faults; VNF instance assisted or automated healing; VNF instance termination; VNF lifecycle management change notification; management of the integrity of the VNF instance through its lifecycle; and overall coordination and adaptation role for configuration and event reporting between the VIM and the EM. The aforementioned functionalities may be exposed by means of interfaces and consumed by other NFV-MANO functional blocks or by authorised external entities:

The deployment and operational behaviour of each VNF is captured in a template called Virtualised Network Function Descriptor (VNFD) that is stored in the VNF catalogue. NFV-MANO uses a VNFD to create instances of the VNF it represents, and to manage the lifecycle of those instances. A VNFD has a one-to-one correspondence with a VNF Package, and it fully describes the attributes and requirements necessary to realize such a VNF. NFVI resources are assigned to a VNF based on the requirements captured in the VNFD (containing resource allocation criteria, among others), but also taking into consideration specific requirements, constraints, and policies that have been pre-provisioned or are accompanying the request for instantiation and may override certain requirements in the VNFD (e.g., operator policies, geo-location placement, affinity/anti-affinity rules, local regulations).

The information elements to be handled by the NFV-MANO, including the VNFD among others, need to guarantee the flexible deployment and portability of VNF instances on multi-vendor and diverse NFVI environments, e.g., with diverse computing resource generations, diverse virtual network technologies, etc. To achieve this, hardware resources need to be properly abstracted and the VNF requirements be described in terms of such abstraction.

The VNFM has access to a repository of available VNF Packages and different versions of them, all represented via their associated VNFDs. Different versions of a VNF Package may correspond to different implementations of the same function, different versions to run in different execution environments (e.g., on different hypervisors, dependent on NFVI resources availability information, etc.), or different release versions of the same software. The repository may be maintained by the NFVO or another external entity.

The Virtualised Infrastructure Manager (VIM) is responsible for controlling and managing the NFVI resources (e.g., compute, storage and network resources) usually within one operator's Infrastructure Domain (e.g., all resources within an NFVI-POP, resources across multiple NFVI-POPs, or a subset of resources within an NFVI-POP) as discussed previously. The VIM manages the life cycle of virtual resources with the NFVI (e.g., creation, maintenance, and tear down of VMs associated with one or more physical resources), tracks VM instances, tracks performance, fault, and security of VM instances and associated physical resources, and exposes VM instances and associated physical resources to other management systems. The VIM may be specialized in handling a certain type of NFVI resources (e.g., compute-only, storage-only, networking-only), or may be capable of managing multiple types of NFVI resources (e.g., in NFVI-Nodes).

The southbound interfaces interface with a variety of hypervisors and Network Controllers in order to perform the functionality exposed through its northbound interfaces. Other VIM implementations may directly expose the interfaces exposed by such compute, storage, Network Controllers as specialized VIMs. A particular example of a specialized VIM is a WAN Infrastructure Manager (WIM), typically used to establish connectivity between PNF endpoints in different NFVI-PoPs. The VIM implementation is out of scope for NFV-MANO; however the interfaces exposed by VIMs are in-scope.

The VIM is operable or configurable to: orchestrate the allocation/upgrade/release/reclamation of NFVI resources (including the optimization of such resources usage), and manage the association of the virtualised resources to the physical compute, storage, networking resources, wherein the VIM keeps an inventory of the allocation of virtual resources to physical resources, e.g., to a server pool and/or the like; support the management of VNF Forwarding Graphs (create, query, update, delete), e.g., by creating and maintaining Virtual Links, virtual networks, sub-nets, and ports, as well as the management of security group policies to ensure network/traffic access control; manage, in a repository, inventory related information of NFVI hardware resources (e.g., compute, storage, networking) and software resources (e.g., hypervisors), and discovery of the capabilities and features (e.g., related to usage optimization) of such resources; manage the virtualised resource capacity (e.g., density of virtualised resources to physical resources), and forwarding of information related to NFVI resources capacity and usage reporting; manage software images (add, delete, update, query, copy) as requested by other NFV-MANO functional blocks (e.g., NFVO)—the VIM maintains repositories for software images, in order to streamline the allocation of virtualised computing resources, and a validation step, performed by VIM, is required for software images before storing the image (e.g., VNF package on-boarding and update). Image validation operations during run-time, e.g., during instantiation or scaling, are outside the scope of the current version of the present document; collect performance and fault information (e.g., via notifications) of hardware resources (compute, storage, and networking) software resources (e.g., hypervisors), and virtualised resources (e.g., VMs); and forwarding of performance measurement results and faults/events information relative to virtualised resources; and manage catalogues of virtualised resources that can be consumed from the NFVI. The elements in the catalogue may be in the form of virtualised resource configurations (virtual CPU configurations, types of network connectivity (e.g., L2, L3), etc.), and/or templates (e.g., a virtual machine with 2 virtual CPUs and 2 GB of virtual memory).

Figure 16:
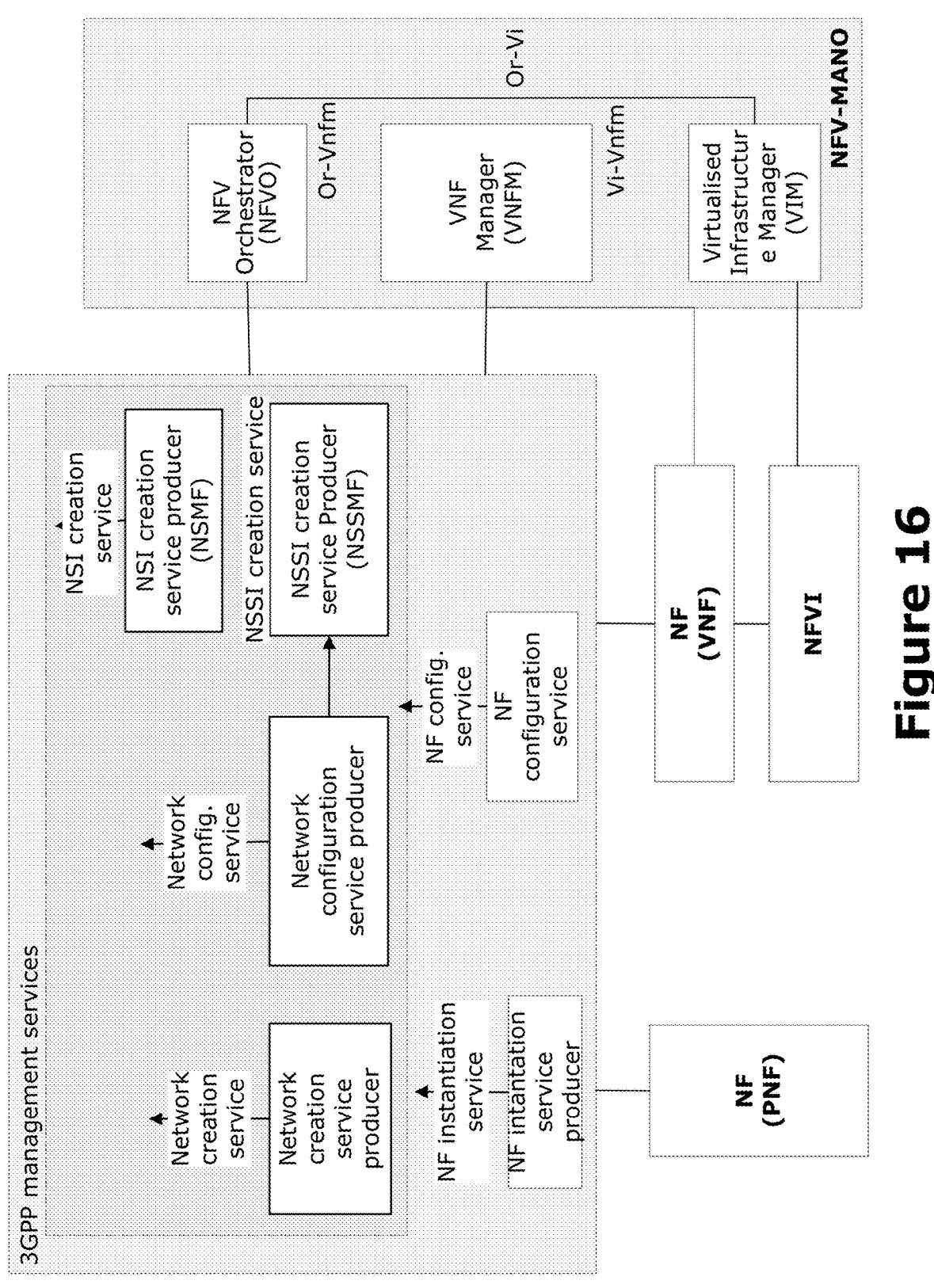
FIG. 16 illustrates another example of a management services architecture.

FIG. 16 depicts another example of a management services architecture. Note: the management services (e.g., NF instantiation services) may be named differently than as shown by FIGS. 15 and 16, the name of the management services are not the focus of the present embodiments; the present disclosure is related to the functionality of the management services.

In the examples of FIGS. 15 and/or 16, the NF instantiation service producer may provide a management service to a consumer, by receiving a request from a consumer to instantiate a 3GPP NF; checking whether the VNF package (s) of the VNF(s) realizing the virtualized part of the 3GPP NF have been on-boarded to the NFV MANO system, and on-boarding the VNF package(s) that have not been on-boarded yet; interacting with the NFV MANO system to instantiate the VNF(s) that are realizing the virtualized part of subject 3GPP NF; informing the consumer that the 3GPP NF has been instantiated; and creating the Managed Object Instances (MOIs) for the subject 3GPP NF.

The NF configuration service producer may provide management services to a consumer, by receiving a request from a consumer to configure a 3GPP NF instance; configuring the 3GPP NF instance; and informing the consumer that the 3GPP NF instance has been configured. The request from the consumer to configure a 3GPP NF instance may include a request to create the MOI(s) for the 3GPP NF. The request from the consumer to configure the 3GPP NF instance may be a MOI attribute modification request. Configuring the 3GPP NF instance may include interaction with the ETSI NFV MANO system to update the corresponding VNF instance(s) realizing the virtualized part of the 3GPP NF.

The network creation service producer may provide management services to a consumer, by receiving a request from a consumer to create a 3GPP network; preparing the NSD(s) for the NS(s) that are to realize the requested 3GPP network, and on-boarding the NSD(s) to ETSI NFV MANO system; on-boarding the VNF package(s) of the constituent VNFs to ETSI NFV MANO system, if the VNF package has not yet been on-boarded; interacting with ETSI NFV MANO system to instantiate the NS(s); consuming a management service to configure the 3GPP NF instance(s) that are constituting the subject 3GPP network; and creating the MOI(s) for the created network. The interaction with the ETSI NFV MANO system to instantiate the NS(s) may include the instantiation of constitute (constituent VNFs). The ETSI NFV MANO system may inform the management service producer about the instantiation of VNFs. The management service producer may create the MOI(s) for the newly instantiated VNFs, and may provide the NF configuration service. Additionally, the management service being consumed to configure the 3GPP NF instance(s) may be the NF configuration service.

The network configuration service producer may provide management services to a consumer, by receiving a request from a consumer to configure a 3GPP network; configuring the 3GPP network; and informing the consumer that the 3GPP network has been configured. The request from the consumer to configure a 3GPP network includes a request to create the MOI(s) for the 3GPP network, and the request from the consumer to configure a 3GPP network is a MOI attribute modification request. Configuring the 3GPP network further may include interaction with the ETSI NFV MANO system to update the corresponding NS instance(s) realizing (fully or partially) the 3GPP network. The interaction with the ETSI NFV MANO system to update the NS(s) may include the instantiation of new VNFs. The ETSI NFV MANO system may inform a management service producer about the instantiation of VNFs. The management service producer may create the MOI(s) for the newly instantiated VNFs, and the management service producer may provide the NF configuration service. In addition, configuring the 3GPP network further includes configuring the 3GPP NFs, and configuring the 3GPP NFs may be via consuming the management service for NF configuration.

The NSSI creation service producer (NSSMF) may create a NSSI for a consumer, by consuming a management service to configure the 3GPP network; and/or consuming a management service to configure the 3GPP NF(s). The management service consumed to configure the 3GPP network may be a network configuration service, and the management service consumed to configure the 3GPP NF(s) may be an NF configuration service.

7. Example Implementations

Figure 17:
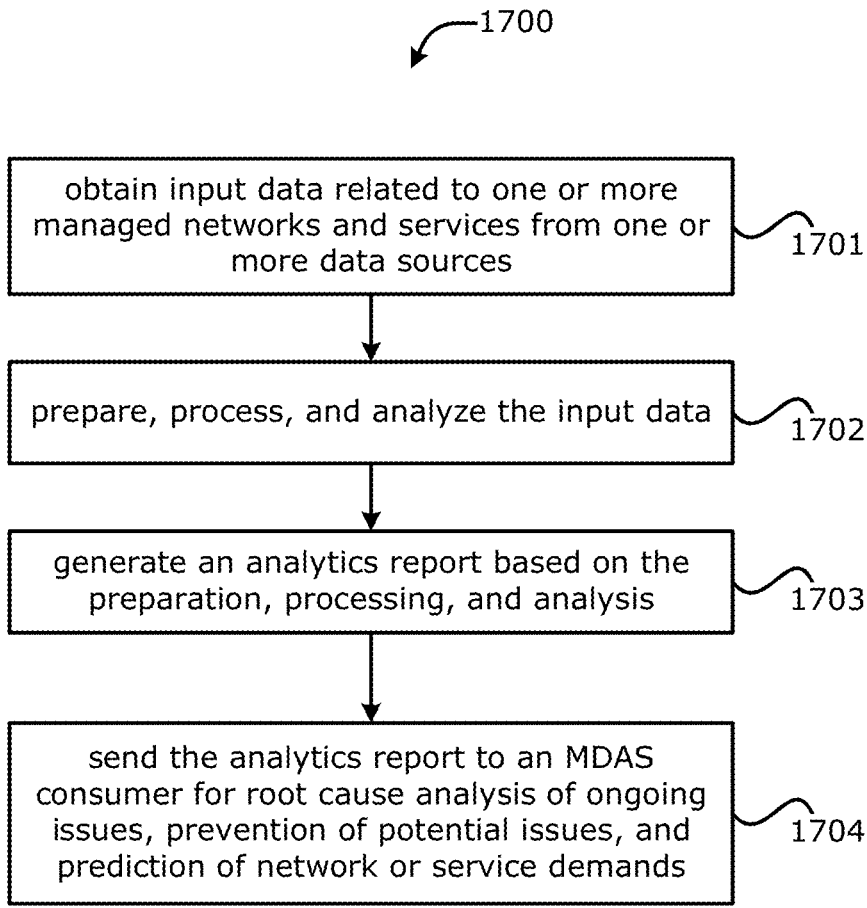
FIG. 17 illustrates an example procedure for practicing various embodiments discussed herein.

FIG. 17 illustrates process 1700 for practicing various embodiments herein. While particular examples and orders of operations are illustrated FIG. 17, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 1700 may be performed by an MDAS producer. Process 1700 begins at operation 1701 wherein the MDAS producer obtains input data related to one or more managed networks and services from one or more data sources. At operation 1702, the MDAS producer prepares, processes, and analyzes the input data. At operation 1703, the MDAS producer generates an analytics report based on the preparation, processing, and analysis. At operation 1704, the MDAS producer sends the analytics report to an MDAS consumer for root cause analysis of ongoing issues, prevention of potential issues, and prediction of network or service demands.

Additional examples of the presently described embodiments include the following, non-limiting implementations. Each of the following non-limiting examples may stand on its own or may be combined in any permutation or combination with any one or more of the other examples provided below or throughout the present disclosure.

Example A01 includes a service producer for MDA supported by one or more processors configured to: receive input data; prepare the received data; analyze the prepared data; provide an analytics report to an MDA consumer; and evaluate results of actions executed by the MDA consumer.

Example A02 includes the service producer of example A01 and/or some other example(s) herein, wherein the MDA is for network management and orchestration and/or service management and orchestration.

Example A03 includes the service producer of examples A01 and A02 and/or some other example(s) herein, wherein the input data includes at least one type of the following data: performance measurement; alarm information; configuration data; trace data; MDT reports; RLF reports; RCEF reports; data provided by NWDAF; QoE data; geographical data; terrain data; execution reports provided by the MDA consumer; and evaluation results of the actions executed by the MDA consumer.

Example A04 includes the service producer of example A01 and/or some other example(s) herein, wherein the service producer of MDA is an MDAF.

Example A05 includes the service producer of example A01 and/or some other example(s) herein, wherein the MDAS consumer is a SON function.

Example A06 includes the service producer of examples A04 and A05 and/or some other example(s) herein, wherein the SON function takes actions based on the analytics report provided by the MDAF.

Example A07 includes the service producer of examples A04 to A06 and/or some other example(s) herein, wherein the MDAF receives the execution report from the SON function.

Example A08 includes the service producer of example A01 and/or some other example(s) herein, wherein the MDA is for coverage issue analysis.

Example A09 includes the service producer of examples A01 and A08 and/or some other example(s) herein, wherein the analytics report describes an identified coverage issue.

Example A10 includes the service producer of examples A01, A08 and A09 and/or some other example(s) herein, wherein the analytics report includes at least one of the following information describing the coverage issue: an identifier of the coverage issue described in the analytics report; an indication of whether the coverage issue is weak coverage or coverage hole; a start time of the coverage issue; a geographical area and location where the coverage issue exists; whether the coverage issue exists in 5G only or in all RATs; cells affected by the coverage issue; severity level (e.g., critical, medium) of the coverage issue; recommended actions to solve the coverage issue.

Example A11 includes the service producer of examples A01, A08, A09 and A10 and/or some other example(s) herein, wherein the service producer is informed when the actions are taken by the MDAS consumer to solve the coverage issue described in the analytics report.

Example A12 includes the service producer of examples A01, A08, A09 and A10 and/or some other example(s) herein, wherein the service producer gets the execution reports of the actions taken by the MDAS consumer to solve the coverage issue described in the analytics report.

Example A13 includes the service producer of examples A01, A08, A09, A10 and A12 and/or some other example(s) herein, wherein the service producer provides the update(s) of analytics report to indicate if the coverage issue is solved, mitigated or deteriorated.

Example B01 includes a method to be performed by a Management Data Analytics service (MDAS) producer, the method comprising: receiving input data; preparing the received input data for analysis; generating an MDAS report based on analysis of the prepared data; sending the MDAS report to an MDAS consumer; receiving an execution report from the MDAS consumer wherein the execution report indicates actions executed by the MDAS consumer based at least in part on the MDAS report; and evaluating results of the actions executed by the MDAS consumer indicated by the execution report.

Example B02 includes the method of example B01 and/or some other example(s) herein, wherein the MDAS is for network management and orchestration and/or service management and orchestration.

Example B03 includes the method of examples B01 and B02 and/or some other example(s) herein, wherein the input data includes one or more of performance measurements, alarm informations, configuration data, trace data, Minimization Drive Test (MDT) reports, Radio Link Failure (RLF) reports, RRC Connection Establishment Failure (RCEF) reports; data provided by Network Data Analytics Function (NWDAF); QoE data; geographical data; terrain data; execution reports provided by the MDAS consumer; evaluation results of the actions executed by the MDAS consumer, and/or Charging Data Record (CDR) data.

Example B04 includes the method of example B03 and/or some other example(s) herein, wherein the performance measurements includes one or more of RSRP measurements and/or statistics, RSRQ measurements and/or statistics, SINR measurements and/or statistics, RLF measurements of Synchronization Signal Block (SSB) beams, and/or handover failures, and the CDR data includes one or more of voice service results including voice call drops, SMS service results, Data Volume Uplink and Downlink, Report Time, Presence Reporting Area Status, and/or other like CDR data.

Example B05 includes the method of example B01 and/or some other example(s) herein, wherein the MDAS producer is an Management Data Analytics Function (MDAF), and the MDAS consumer is a Self-Organizing Network (SON) function.

Example B06 includes the method of examples B01-B05 and/or some other example(s) herein, wherein the SON function is a centralized SON function, distributed SON function, or hybrid SON function.

Example B07 includes the method of examples B05-B06 and/or some other example(s) herein, wherein the SON function is an Automatic Neighbor Relation (ANR) function, network function (NF) self-establishment function, PCI configuration function, automatic radio configuration data function (ARCF), inter-cell interference coordination (ICIC) function, RACH optimization function, Centralized or Distributed Capacity and Coverage Optimization (CCO) function, a self-healing function, a trace and MDT function, mobility robustness optimization function, energy savings management (ESM) function, cross-slice network resource optimization function.

Example B08 includes the method of examples B05-B07 and/or some other example(s) herein, wherein the SON function takes actions based on the MDAS report provided by the MDAF.

Example B09 includes the method of examples B05-B08 and/or some other example(s) herein, wherein the MDAF receives the execution report from the SON function, and the actions executed by the SON function include one or more SON function actions.

Example B10 includes the method of examples B01-B09 and/or some other example(s) herein, wherein the MDAS is for coverage issue analysis.

Example B11 includes the method of examples B01-B10 and/or some other example(s) herein, wherein the MDAS report describes an identified coverage issue.

Example B12 includes the method of examples B01-B11 and/or some other example(s) herein, wherein the MDAS report includes one or more of: information describing the coverage issue: an identifier of the coverage issue described in the MDAS report; an indication of whether the coverage issue is a weak coverage or a coverage hole; a start time of the coverage issue; a geographical area and/or location where the coverage issue exists or is detected; whether the coverage issue exists in 5G only or in all RATs; number and/or identity of cells affected by the coverage issue; a severity level of the coverage issue; and one or more recommended actions to solve the coverage issue.

Example B13 includes the method of examples B01-B12 and/or some other example(s) herein, wherein the actions executed by the MDAS consumer indicated by the execution report includes actions executed by the MDAS consumer to solve the coverage issue described in the MDAS report.

Example B14 includes the method of example B13 and/or some other example(s) herein, wherein the execution report indicates success or failure of the actions executed by the MDAS consumer to solve the coverage issue described in the MDAS report.

Example B15 includes the method of examples B01-B14 and/or some other example(s) herein, further comprising: in response to receipt of the execution report, generating or causing to generate an updated MDAS report to indicate whether the coverage issue is solved, mitigated, or deteriorated.

Example Z01 may include an apparatus comprising means to perform one or more elements of a method described in or related to any of examples A01-A13, B01-B15, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A01-A13, B01-B15, or any other method or process described herein.

Example Z03 may include an apparatus comprising logic, modules, or circuitry to perform one or more elements of a method described in or related to any of examples A01-A13, B01-B15, or any other method or process described herein.

Example Z04 may include a method, technique, or process as described in or related to any of examples A01-A13, B01-B15, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A01-A13, B01-B15, or portions thereof.

Example Z06 may include a signal as described in or related to any of examples A01-A13, B01-B15, or portions or parts thereof.

Example Z07 may include a datagram, packet, frame, segment, protocol data unit (PDU), or message as described in or related to any of examples A01-A13, B01-B15, or portions or parts thereof, or otherwise described in the present disclosure.

Example Z08 may include a signal encoded with data as described in or related to any of examples A01-A13, B01-B15, or portions or parts thereof, or otherwise described in the present disclosure.

Example Z09 may include a signal encoded with a datagram, packet, frame, segment, protocol data unit (PDU), or message as described in or related to any of examples A01-A13, B01-B15, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A01-A13, B01-B15, or portions thereof.

Example Z11 may include a computer program comprising instructions, wherein execution of the program by a processing element is to cause the processing element to carry out the method, techniques, or process as described in or related to any of examples A01-A13, B01-B15, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

8. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices.

The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "SMTC" refers to an SSB-based measurement timing configuration configured by SSB-MeasurementTimingConfiguration. The term "SSB" refers to an SS/PBCH block. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with carrier aggregation (CA). The term "Special Cell" refers to the PCell of the MCG or the PSCell of the SCG for DC operation; otherwise, the term "Special Cell" refers to the Pcell.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MULTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WIDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.1 lay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

A "network slice" refers to a logical network that provides specific network capabilities and network characteristics, supporting various service properties for network slice customers. A "Network Slice instance" or "NSI" represents service view of a network slice which exposes the root NetworkSliceSubnet instance. A "network slice subnet" is a representation of a set of network functions and the associated resources (e.g., compute, storage and networking resources) supporting network. A Network Slice Subnet instance" or "NSSI" refers to a Managed Object Instance (MOI) of Network Slice Subnet Information Object Class (IOC). A "Service Level Specification" or "SLS" refers to a set of service level requirements associated with a Service Level Agreement (SLA) to be satisfied by a network slice.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. An apparatus to be employed as a Management Data Analytics Service (MDAS) producer, wherein the apparatus comprises:

memory circuitry; and processor circuitry communicatively coupled with the memory circuitry, wherein the processor circuitry configures the MDAS producer to:

identify analytics data related to coverage of a cellular network with which the MDAS producer is associated;

identify, based on the analytics data, a problem related to the coverage of the cellular network;

determine a root cause of the problem;

determine a recommended action to take to mitigate the root cause of the problem;

generate an analytics report related to the problem, the analytics report containing the recommended action, an indication of a type of the problem, a start time and a stop time of the problem, a severity level of the problem, an indication of whether the problem exists in 5G only or in all radio access technologies, an identification of cells affected by the problem, the root cause of the problem, and an indication of a geographical area of the problem; and transmit, to a MDAS consumer, the analytics report for the MDAS consumer to take the recommended action.

2. The apparatus of claim 1, wherein the analytics report is generated based at least in part on a machine learning (ML) model.

3. The apparatus of claim 1, wherein the analytics data is related to a minimization of drive test (MDT) report that is related to reference signal received power (RSRP) measurements of a serving cell and neighbor cells of the cellular network.

4. The apparatus of claim 1, wherein the analytics data is related to a geographical area of a radio access network (RAN) of the cellular network.

5. One or more non-transitory computer-readable media (NTCRM) comprising instructions that, upon execution of the instructions by one or more processors of an electronic device, are to cause a Management Data Analytics Service (MDAS) producer to:

identify analytics data related to coverage of a cellular network with which the MDAS producer is associated;

identify, based on the analytics data, a problem related to the coverage of the cellular network;

determine a root cause of the problem;

determine a recommended action to take to mitigate the root cause of the problem;

generate an analytics report related to the problem, the analytics report containing the recommended action, an indication of a type of the problem, a start time and a stop time of the problem, a severity level of the problem, an indication of whether the problem exists in 5G only or in all radio access technologies, an identification of cells affected by the problem, the root cause of the problem, and an indication of a geographical area of the problem; and transmit, to a MDAS consumer, the analytics report for the MDAS consumer to take the recommended action.

6. The one or more NTCRM of claim 5, wherein the analytics report is generated based at least in part on a machine learning (ML) model.

7. The one or more NTCRM of claim 5, wherein the analytics data is related to a minimization of drive test (MDT) report that is related to reference signal received power (RSRP) measurements of a serving cell and neighbor cells of the cellular network.

8. The one or more NTCRM of claim 5, wherein the analytics data is related to a geographical area of a radio access network (RAN) of the cellular network.

9. An apparatus to be employed as a Management Data Analytics Service (MDAS) consumer, wherein the apparatus comprises:

memory circuitry to store an analytics report, received from a MDAS producer, related to a coverage problem of a cellular network associated with the MDAS consumer the analytics report based on analytics data related to the coverage problem, and including an indication of a recommended action to be taken to remedy a root cause of the coverage problem, an indication of a type of the coverage problem, a start time and a stop time of the coverage problem, a severity level of the coverage problem, an indication of whether the coverage problem exists in 5G only or in all radio access technologies, an identification of cells affected by the coverage problem, the root cause of the coverage problem, and an indication of a geographical area of the coverage problem; and processor circuitry communicatively coupled with the memory circuitry, wherein the processor circuitry is configured perform the recommended action.

10. The apparatus of claim 9, wherein the analytics report is generated based at least in part on a machine learning (ML) model.

11. The apparatus of claim 9, wherein the analytics data is related to a minimization of drive test (MDT) report that is related to reference signal received power (RSRP) measurements of a serving cell and neighbor cells of the cellular network.

12. The apparatus of claim 9, wherein the analytics data is related to a geographical area of a radio access network (RAN) of the cellular network.

13. The apparatus of claim 1, wherein the processor circuitry is configured to identify a plurality of problems based on the analytics data and determine the root cause as a basis for the plurality of problems and the recommended action to take to mitigate the root cause of the plurality of problems.

14. The apparatus of claim 1, wherein the severity level of the problem is selected from a group that includes critical severity level, at least one non-critical severity level, and cleared.

15. The apparatus of claim 1, wherein the type of the problem is selected from a group of problems that include weak coverage, coverage hole, pilot pollution, overshoot coverage, and downlink/uplink channel coverage mismatch.

16. The apparatus of claim 1, wherein the processor circuitry is further configured to receive, from the MDAS consumer, execution reports describing actions taken in response to the analytics report, and to update subsequent analytics reports based at least in part on the execution reports.

17. The apparatus of claim 1, wherein the analytics report further includes an indication of a confidence level associated with the problem.

18. The apparatus of claim 1, wherein the analytics report includes information describing ongoing coverage problems and predicted potential coverage problems.

19. The apparatus of claim 1, wherein the analytics report further includes an identifier of the problem.

* * * * *